US012738538B2

(12) United States Patent
Kim et al.

(10) Patent No.: US 12,738,538 B2
(45) Date of Patent: Sep. 15, 2026

(54) CROSS-LINKING AGENT FOR QUASI-SOLID ELECTROLYTE, QUASI-SOLID ELECTROLYTE COMPRISING SAME, AND SECONDARY BATTERY USING SAME

(71) Applicant: IUCF-HYU (INDUSTRY-UNIVERSITY COOPERATION FOUNDATION HANYANG UNIVERSITY), Seoul (KR)

(72) Inventors: Dong-Won Kim, Seoul (KR); A-Hyeon Ban, Seoul (KR); Tae-Hyun Park, Siheung-si (KR); Myung-Soo Park, Seoul (KR); Su-Jin Pyo, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 480 days.

(21) Appl. No.: 18/564,103

(22) PCT Filed: Mar. 4, 2022

(86) PCT No.: PCT/KR2022/003111

§ 371 (c)(1),
(2) Date: Nov. 27, 2023

(87) PCT Pub. No.: WO2022/250254

PCT Pub. Date: Dec. 1, 2022

(65) Prior Publication Data

US 2024/0266600 A1 Aug. 8, 2024

(30) Foreign Application Priority Data

May 26, 2021 (KR) ........................ 10-2021-0067801

(51) Int. Cl.
*H01M 10/0565* (2010.01)
*C07F 5/04* (2006.01)
(Continued)

(52) U.S. Cl.
CPC ........... *H01M 10/0565* (2013.01); *C07F 5/04* (2013.01); *C07F 5/05* (2013.01); *C08K 5/55* (2013.01);
(Continued)

(58) Field of Classification Search
None
See application file for complete search history.

(56) References Cited

FOREIGN PATENT DOCUMENTS

| | | | |
|---|---|---|---|
| CN | 103500845 | A | 1/2014 |
| CN | 109786820 | A | 5/2019 |

(Continued)

OTHER PUBLICATIONS

Machine translation of KR 2017-0137279 (Year: 2017).*

*Primary Examiner* — Wyatt P Mcconnell
(74) *Attorney, Agent, or Firm* — NKL Law; Jae Youn Kim

(57) ABSTRACT

The present invention relates to: a cross-linking agent for a quasi-solid electrolyte, the agent being a polyester derivative comprising boron at the center thereof; a quasi-solid electrolyte using the cross-linking agent for a quasi-solid electrolyte; and a secondary battery using same.

23 Claims, 14 Drawing Sheets

(51) Int. Cl.
*C07F 5/05* (2006.01)
*C08K 5/55* (2006.01)

(52) U.S. Cl.
CPC ............... *H01M 2300/0025* (2013.01); *H01M 2300/0085* (2013.01)

(56) References Cited

FOREIGN PATENT DOCUMENTS

| | | | |
|---|---|---|---|
| JP | 2008117762 | A | 5/2008 |
| KR | 20010029730 | A | 4/2001 |
| KR | 20070010962 | A | 1/2007 |
| KR | 20080105045 | A | 12/2008 |
| KR | 20120057168 | A | 6/2012 |
| KR | 20140046611 | A | 4/2014 |
| KR | 20170137279 | A | 12/2017 |
| KR | 20200095188 | A | 8/2020 |

* cited by examiner

Current density (mA cm$^{-2}$)
0.00
0.01
0.02
0.03
0.04
0.05
Preparation Example 1
Preparation Example 2
3.0
3.5
4.0
4.5
5.0
5.5
6.0
Applied potential (V vs Na/Na$^+$)

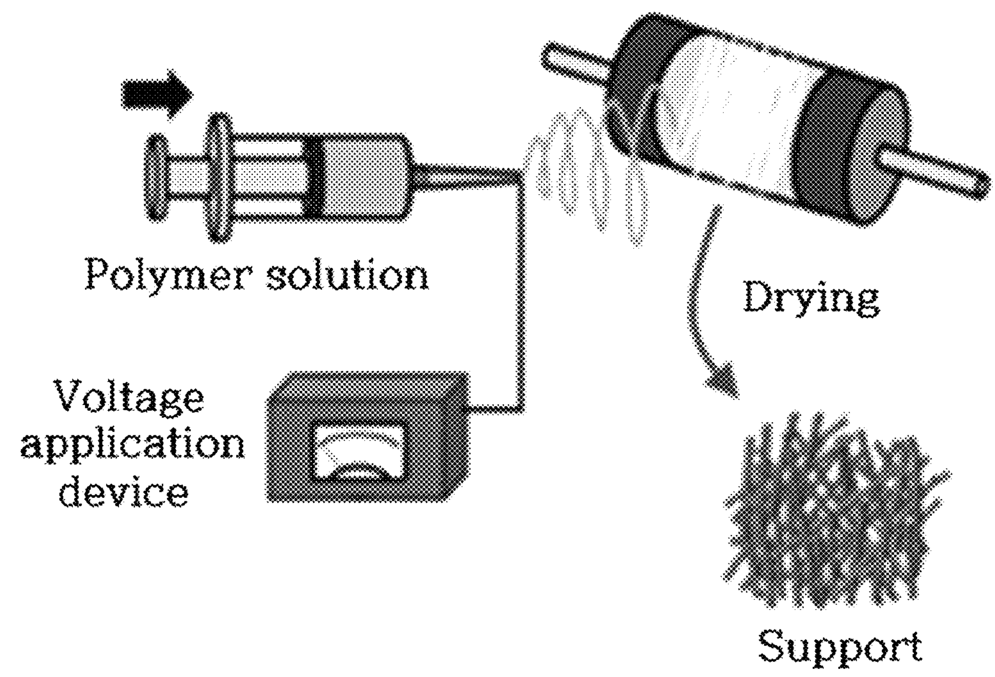
FIG. 3A
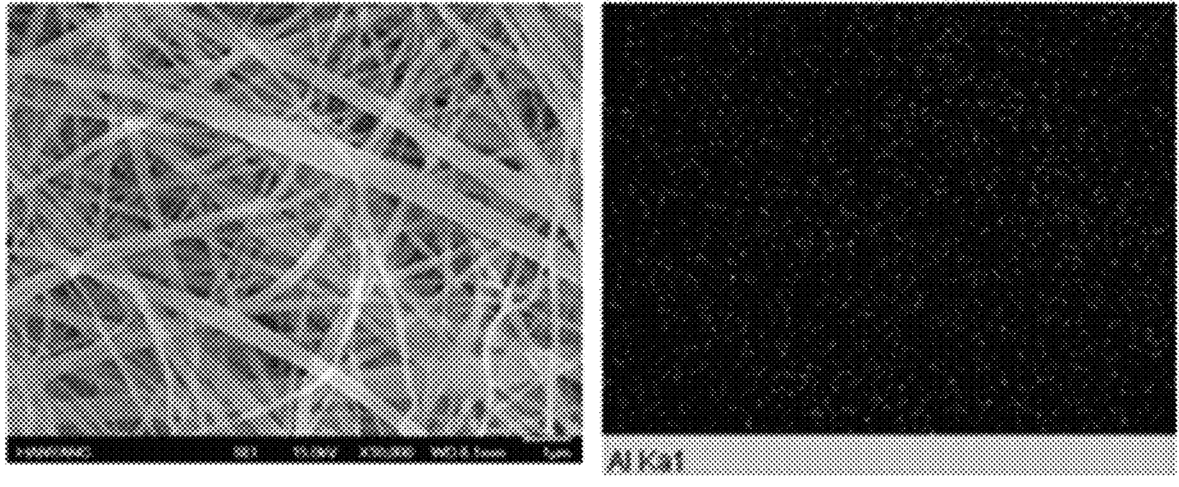
FIG. 3B
FIG. 3C

CROSS-LINKING AGENT FOR QUASI-SOLID ELECTROLYTE, QUASI-SOLID ELECTROLYTE COMPRISING SAME, AND SECONDARY BATTERY USING SAME

TECHNICAL FIELD

The present invention relates to a cross-linking agent for a quasi-solid electrolyte, a quasi-solid electrolyte including the same, and a secondary battery using the same, and more specifically, to a cross-linking agent for a quasi-solid electrolyte, which can improve the mobility of ions and exhibit excellent cycle characteristics by using a novel cross-linking agent, a quasi-solid electrolyte including the same, and a secondary battery using the same.

BACKGROUND ART

With the development of portable mobile electronic devices such as smartphones, MP3 players, and tablet PCs, the demand for secondary batteries capable of storing electrical energy is explosively increasing. In particular, with the emergence of electric vehicles, mid- to large-sized energy storage systems, and portable devices requiring high energy density, demand for secondary batteries is increasing.

Meanwhile, existing secondary batteries use non-aqueous organic electrolytes in a liquid state, which have the risk of ignition and explosion. In fact, it is urgent to solve such a problem since explosion accidents of products having these applied thereto continuously occur.

In order to solve this problem, research on ionic liquid electrolytes and gel polymer electrolytes is actively underway. An ionic liquid refers to a salt in a liquid state consisting only of ions having a melting point of room temperature or lower. Ionic liquid electrolytes have excellent flame retardant properties, but have disadvantages such as leakage problems due to the characteristics of the liquid phase, low ionic conductivity due to high viscosity characteristics, and low alkaline cation mobility due to the conduction participation of the ions that make up the ionic liquid. Gel polymer electrolytes are prepared in a semi-solid form through the polymerization reaction of a cross-linking agent contained in a precursor solution, and can partially solve battery safety problems by preventing leakage of the liquid electrolyte. However, the mainly used cross-linking agent containing a glycol functional group has disadvantages such as the possibility of ignition and low electrochemical stability.

Therefore, various researches are being conducted on gel polymer electrolytes that have excellent electrochemical performance while improving the safety of secondary batteries.

PRIOR PATENTS

Korean Patent Application No. 10-2008-7020458 (Dec. 11, 2006)

Korean Patent Application No. 10-2000-0027002 (May 19, 2005)

DISCLOSURE

Technical Problem

One technical problem that this application seeks to solve is to provide a novel cross-linking agent for a quasi-solid electrolyte, a quasi-solid electrolyte prepared using the same, and a secondary battery using the same.

Another technical problem that this application seeks to solve is to provide a quasi-solid electrolyte that exhibits excellent electrochemical and cycle characteristics due to improved cation mobility and a secondary battery using the same.

The technical problem that this application seeks to solve is not limited to those described above.

Technical Solution

In order to solve the above technical problems, the present invention provides a cross-linking agent for a quasi-solid electrolyte, a quasi-solid electrolyte prepared using the same, and a secondary battery using the same.

In one embodiment, a cross-linking agent for a quasi-solid electrolyte may be represented by the following Formula 1 or Formula 2.

[Formula 1]

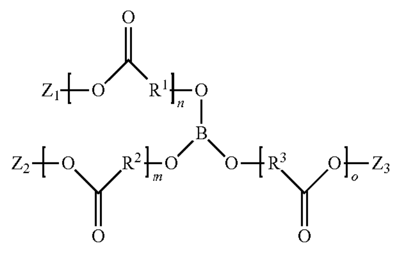

[Formula 2]

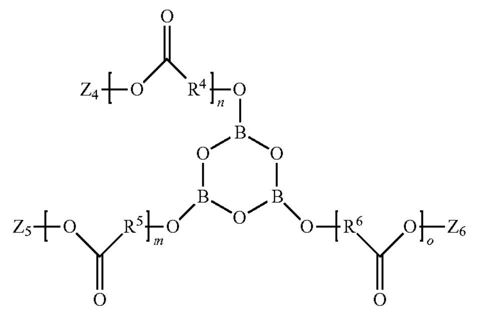

In one embodiment, $R^1$ to $R^6$ in Formula 1 and Formula 2 may be each independently a substituted or unsubstituted $C_1$-$C_{30}$ alkyl group, a substituted or unsubstituted $C_1$-$C_{30}$ haloalkyl group, or a substituted or unsubstituted $C_1$-$C_{30}$ hydroxyalkyl group, n, m, and o may be each an integer of 1 to 15, and $Z_1$ to $Z_6$ may be each independently

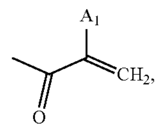

where $A_1$ may independently be hydrogen, a substituted or unsubstituted $C_1$-$C_{12}$ alkyl group, a substituted or unsubstituted $C_1$-$C_{12}$ haloalkyl group, or a substituted or unsubstituted $C_1$-$C_{12}$ hydroxyalkyl group.

In one embodiment, $Z_1$ to $Z_6$ in Formula 1 or Formula 2 may be each independently an acryloyl group or a methacryloyl group.

In one embodiment, $R^1$ to $R^6$ in Formula 1 or Formula 2 may be each independently a substituted or unsubstituted $C_1$-$C_8$ alkyl group.

In one embodiment, the cross-linking agent for a quasi-solid electrolyte may be coordination-bonded to an anion of an alkali metal salt.

In one embodiment, the alkali metal salt may be a lithium salt or a sodium salt.

According to another aspect of the present invention, a method for preparing a cross-linking agent for a quasi-solid electrolyte, including: a first operation of adding a polyol compound having two hydroxyl groups in the molecular structure and an amine compound to a first reaction solvent and then stirring the polyol compound, the amine compound, and the first reaction solvent to prepare a first mixture, and mixing a (meta)acryloyl group compound containing an acryloyl group or a methacryloyl group with a second reaction solvent to prepare a second mixture; a second operation of adding the second mixture thereto while maintaining the first mixture at −5° C. to 5° C. in an inert gas atmosphere, raising the temperature to room temperature, and then stirring and reacting the first mixture and the second mixture at room temperature for 10 to 20 hours, and then purifying the reactant to manufacture an intermediate product; and a third operation of adding the intermediate product to a third reaction solvent in an inert gas atmosphere, and then primarily stirring a boron compound containing one or more boron at 45° C. to 55° C. for 1.5 to 7 hours, and then secondarily stirring the primarily stirred mixture at 65° C. to 80° C. for 1 to 5 hours and drying the secondarily stirred mixture in a vacuum oven.

In one embodiment, the polyol compound and the amine compound in the first operation may be added at a ratio in which the ratio $[(OH)/(NH_2)]$ of the number of moles of hydroxyl groups (OH) contained in the polyol compound to the number of moles of amine groups ($NH_2$) contained in the amine compound becomes a range of 1 to 12.

In one embodiment, the drying in the vacuum oven in the third operation is to remove the amine compound and the first to third reaction solvents, and may include performing a first drying in a vacuum oven at 50° C. to 70° C. for 3 to 6 hours, and then performing a second drying in a vacuum oven at 20° C. to 30° C. for 12 to 36 hours.

In one embodiment, the polyol compound may include one or more selected from polycaprolactone diol, poly(tetramethylene ether) glycol (PTMG), poly(propylene glycol) diol (PPG), poly(butylene adipate) diol (PBA), ethylene glycol, 1,3-propanediol, 2-methyl-1,3-propanediol, 1,3-butanediol, 1,4-butanediol, 1,6-hexanediol, 1,4-cyclohexanedimethanol, diethylene glycol, triethylene glycol, neopentyl glycol, dipropylene glycol, and hydroquinone-bis(β-hydroxyethyl) ether.

In one embodiment, the amine compound may include one or more selected from triethylamine, pyridine, N,N-diisopropylethylamine (DIEA), diethylamine, piperidine, pyrrolidine, N-methylmorpholine, 2,6-lutidine, 4-dimethylaminopyridine (DMAP), and imidazole.

In one embodiment, the (meth)acryloyl group compound may include one or more selected from acryloyl chloride and methacryloyl chloride.

In one embodiment, the method for preparing a cross-linking agent for a quasi-solid electrolyte, in which the boron compound may be represented by Formula 3 or Formula 4 below.

[Formula 3]

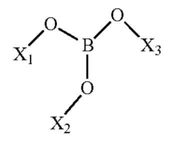

[Formula 4]

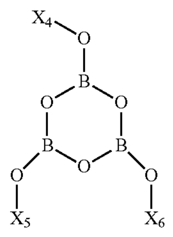

In Formula 3 or Formula 4, $X_1$ to $X_6$ may each independently be a substituted or unsubstituted $C_1$-$C_{30}$ alkyl group, a substituted or unsubstituted $C_1$-$C_{30}$ haloalkyl group, or a substituted or unsubstituted $C_1$-$C_{30}$ hydroxyalkyl group.

In one embodiment, the boron compound may include one or more selected from trimethyl borate (TMB), trihydroxy boroxine, tris(2-methylpropene-1-yl) boroxine, and tris(dimethylamino)boroxine.

In one embodiment, the first to third reaction solvents may include one or more selected from tetrahydrofuran, acetonitrile (ACN), methanol, ethanol, propanol, isopropanol, N,N-dimethylformamide, N,N-dimethylacetamide, N-methylpyrrolidone, and 1,4-dioxane.

According to another aspect of the present invention, the present invention includes a quasi-solid electrolyte for a secondary battery, including: the above-described cross-linking agent for a quasi-solid electrolyte; a porous support; an alkali metal salt; a liquid electrolyte; and a thermal initiator.

In one embodiment, the porous support may include a reticular structure with a porosity of 30% to 90% and a thickness of 10 μm to 200 μm.

In one embodiment, the porous support may include one or more selected from polyethylene, polypropylene, polyvinylidene fluoride, polytetrafluoroethylene, polyethylene terephthalate, polybutylene terephthalate, polyamideimide, polyetherimide, polyacrylonitrile, a cellulose-based material, polyether sulfone, polyphenylsulfone, polyether ketone, and polyether ether ketone.

In one embodiment, the porous support may further include alumina ($Al_2O_3$), and alumina ($Al_2O_3$) may be contained in an amount of 1.5% by weight to 5% by weight.

In one embodiment, the alkali metal salt is a lithium salt or a sodium salt.

In one embodiment, the liquid electrolyte may include an organic solvent and an ionic liquid, the organic solvent may include one or more selected from ethylene carbonate, propylene carbonate, fluoroethylene carbonate, dimethyl carbonate, diethyl carbonate, ethyl methyl carbonate, dimethoxyethane, diethoxyethane, sulfolane, and 1,3-propanesultone, and the ionic liquid may be represented by Formula 5 below.

$X^+Y^-$ [Formula 5]

In Formula 5, X may be a cation selected from the group consisting of imidazolium, ammonium, pyridinium, pyrazolium, piperidinium, triazolium, thiazolium, oxazolium, pyridazinium, pyrimidinium, pyrazinium, phosphonium, pyrrolidinium and sulfonium, and Y may be an anion selected from the group consisting of $BF_4$, $PF_6$, $ClO_4$, $CF_3SO_3$, $N(CF_3SO_2)_2$, $N(C_2F_5SO_2)_2$, $C(CF_2SO_2)_3$, $AsF_6$, $SbF_6$, $AlCl_4$, $NbF_6$, and $CF_3CO_2$.

In one embodiment, the thermal initiator may include one or more selected from t-amyl peroxide, benzoyl peroxide, lauroyl peroxide, t-butyl peroxypivalate, 1,1'-bis-(bis-t-butylperoxy)cyclohexane, 2,2'-azobisisobutyronitrile (AIBN), 2,2'-azobis-(2,4-dimethylvaleronitrile), 2,2'-azobis-(4-methoxy-2,4-dimethylvaleronitrile), 2-cyano-2-propylazoformamide, 1,1'-azobis(cyclohexane-1-carbonitrile), and 2,2'-azobis(2-methylbutyronitrile).

In one embodiment, the cross-linking agent for a quasi-solid electrolyte may be contained in an amount of 1 to 12 parts by weight based on 100 parts by weight of the total amount of the cross-linking agent for a quasi-solid electrolyte, the alkali metal salt, the liquid electrolyte, and the thermal initiator.

According to another aspect of the present invention, the present invention includes a secondary battery including: a cathode; an anode; and a quasi-solid electrolyte for a secondary battery; which is interposed between the cathode and the anode.

Advantageous Effects

According to the present invention as described above, the cross-linking agent for a quasi-solid electrolyte according to the present invention is prepared by a novel method, and can fix anions in the electrolyte and improve the mobility of cations.

In addition, the quasi-solid electrolyte to which the cross-linking agent for a quasi-solid electrolyte according to the present invention is applied has high ionic conductivity and improved heat resistance so that when applied to secondary batteries, the electrochemical properties, cycle characteristics, and safety of the secondary batteries can be improved.

DESCRIPTION OF DRAWINGS

FIGS. 3A, 3B and 3C are a diagram (FIG. 3A) schematically showing a method for preparing a porous polyamide-imide support using electrospinning, an electron micrograph (FIG. 3B) for the prepared porous support, and (FIG. 3C) a view showing the distribution of an aluminum element contained in the prepared porous support.

MODE FOR DISCLOSURE

Figures 1A, 1B:
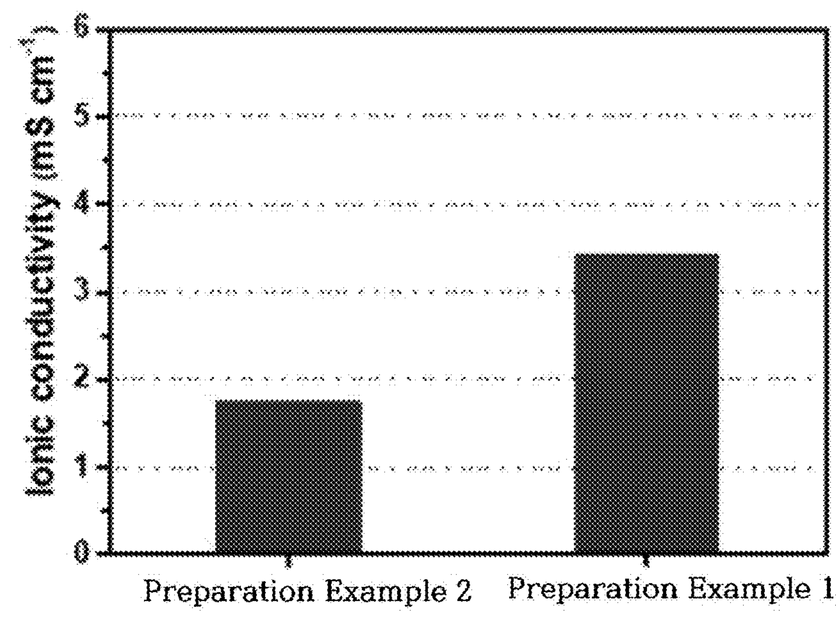
FIGS. 1A and 1B show results of evaluating ionic conductivities (FIG. 1A) of Preparation Example 1 and Preparation Example 2 and electrochemical stabilities (FIG. 1B) using linear sweep voltammetry (LSV) thereof.

Hereinafter, preferred embodiments of the present invention will be described in detail with reference to the accompanying drawings. However, the technical idea of the present invention is not limited to the embodiments described herein and may be embodied in other forms. Rather, the embodiments introduced herein are provided so that the disclosed content will be thorough and complete and so that the spirit of the present invention may be sufficiently conveyed to those skilled in the art.

In this specification, when an element is referred to as being on another element, it means that it may be formed directly on the other element or that a third element may be interposed between them. Additionally, in the drawings, the thicknesses of films and regions are exaggerated for effective explanation of technical content.

Additionally, terms such as first, second, and third in various embodiments of this specification have been used in order to describe various components, but these components should not be limited by these terms. These terms are merely used to distinguish one component from another. Accordingly, what is referred to as a first component in one embodiment may be referred to as a second component in another embodiment. Each embodiment described and illustrated herein also includes its complementary embodiment. Additionally, 'and/or' in this specification is used to mean including at least one of the components listed before and after.

Singular expressions in the specification include plural expressions unless the context clearly dictates otherwise. In addition, terms such as "include" or "have" are intended to designate the presence of a feature, a number, a step, a component, or combinations thereof described in the specification, but should not be understood as excluding the possibility of the presence or addition of one or more other features, numbers, steps, components, or combinations thereof.

In addition, in the following description of the present invention, if a detailed description of a related known function or configuration is judged to unnecessarily obscure the gist of the present invention, the detailed description will be omitted.

One embodiment of the present invention includes a cross-linking agent for a quasi-solid electrolyte represented by Formula 1 or Formula 2 below.

[Formula 1]

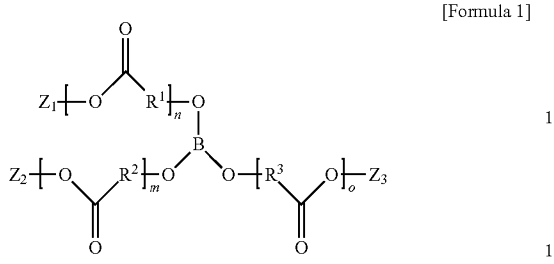

[Formula 2]

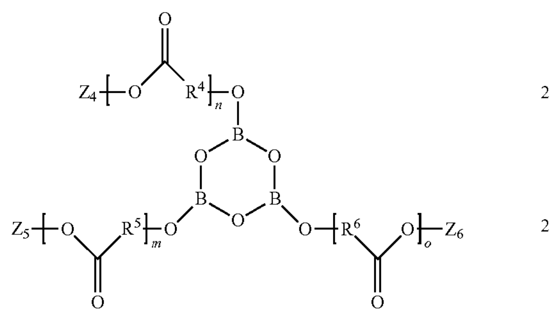

$R^1$ to $R^6$ in Formula 1 and Formula 2 are each independently a substituted or unsubstituted $C_1$-$C_{30}$ alkyl group, a substituted or unsubstituted $C_1$-$C_{30}$ haloalkyl group, or a substituted or unsubstituted $C_1$-$C_{30}$ hydroxyalkyl group, n, m, and o are each an integer of 1 to 15, and $Z_1$ to $Z_6$ are each independently

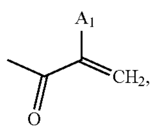

where $A_1$ are each independently hydrogen, a substituted or unsubstituted $C_1$-$C_{12}$ alkyl group, a substituted or unsubstituted $C_1$-$C_{12}$ haloalkyl group, or a substituted or unsubstituted $C_1$-$C_{12}$ hydroxyalkyl group.

Specifically, $Z_1$ to $Z_6$ in Formula 1 or Formula 2 above may each independently be an acryloyl group or a methacryloyl group.

More specifically, $Z_1$ to $Z_3$ above in Formula 1 may all be identical, and $Z_4$ to $Z_6$ above in Formula 2 may all be identical.

In the present invention, an alkyl group refers to a monovalent residue remaining after removing one hydrogen atom from a straight or branched chain hydrocarbon having $C_{1-12}$, and a haloalkyl group refers to an alkyl group substituted with a halogen atom, and a hydroxyalkyl group refers to an alkyl group substituted with a hydroxyl group. In addition, in the present invention, a (meth)acryloyl group is a general term for an acryloyl group and a methacryloyl group, and a (meth)acryloyl group compound may contain both groups in one molecule.

$R^1$ to $R^6$ in Formula 1 or Formula 2 above may each independently be a substituted or unsubstituted $C_1$-$C_8$ alkyl group.

In this embodiment, the cross-linking agent for a quasi-solid electrolyte may be coordinate-bonded with an anion of an alkali metal salt, and for example, the alkali metal salt may include a lithium salt or a sodium salt.

Typically, quasi-solid electrolytes, which are gel polymer electrolytes, are prepared in a semi-solid form through the polymerization reaction of a cross-linking agent contained in the precursor solution, and have advantages capable of preventing leakage that occurred due to existing liquid electrolytes and improving the stability of the battery. Meanwhile, those containing a glycol functional group are used as conventionally used cross-linking agents so that there have been problems in that there is ignition possibility, and electrochemical properties are low.

Meanwhile, the cross-linking agent for a quasi-solid electrolyte according to one embodiment of the present invention can improve the electrochemical properties of the quasi-solid electrolyte by improving cation mobility, and also has an advantage that the ignition possibility is low since it does not contain a glycol functional group. In addition, the cross-linking agent for a quasi-solid electrolyte according to one embodiment of the present invention includes a boron (B) atom at the center to have excellent electrochemical stability by coordination-bonding the cross-linking agent for a quasi-solid electrolyte to an anion, and at the same time includes a polyester structure to enable the cation mobility within the quasi-solid electrolyte to be improved. Specifically, the cross-linking agent for a quasi-solid electrolyte according to one embodiment of the present invention prevents the electron-empty orbital provided by the central boron atom from interfering with the flow of cations by fixing anions in the quasi-solid electrolyte, and at the same time, can improve the electrochemical properties and cycle characteristics of secondary batteries by forming a cation movement channel through the polyester structure.

According to another aspect of the present invention, one embodiment of the present invention may include the above-described method for preparing a cross-linking agent for a quasi-solid electrolyte.

The method for preparing a cross-linking agent for a quasi-solid electrolyte may include: a first operation of adding a polyol compound having two hydroxyl groups in the molecular structure and an amine compound to a first reaction solvent and then stirring them to prepare a first mixture, and mixing a (meta)acryloyl group compound containing an acryloyl group or a methacryloyl group with a second reaction solvent to prepare a second mixture; a second operation of adding the second mixture thereto while maintaining the first mixture at −5° C. to 5° C. in an inert gas atmosphere, raising the temperature to room temperature, and then stirring and reacting the first mixture and the second mixture at room temperature for 10 to 20 hours, and then purifying the reactant to manufacture an intermediate product; and a third operation of adding the intermediate product to a third reaction solvent in an inert gas atmosphere, and then primarily stirring a boron compound containing one or more boron at 45° C. to 55° C. for 1.5 to 7 hours, and then secondarily stirring the primarily stirred mixture at 65° C. to 80° C. for 1 to 5 hours and drying the secondarily stirred mixture in a vacuum oven.

In the first operation, the polyol compound and the amine compound may be added at a ratio in which the ratio $[(OH)/(NH_2)]$ of the number of moles of hydroxyl groups (OH) contained in the polyol compound to the number of moles of amine groups $(NH_2)$ contained in the amine compound is in a range of 1 to 12.

In the first operation, if the ratio [(OH)/($NH_2$)] of the number of moles of hydroxyl groups (OH) contained in the polyol compound to the number of moles of amine groups ($NH_2$) contained in the amine compound is less than 1, it is difficult to produce the desired product since parts that do not react with the aminated compound or (meth)acryloyl group compound generate, and if it exceeds 12, unnecessary side reactions may occur and the ionic conductivity of the quasi-solid electrolyte may be reduced, which may be problematic. Specifically, the ratio [(OH)/($NH_2$)] of the number of moles of hydroxyl groups (OH) contained in the polyol compound to the number of moles of amine groups ($NH_2$) contained in the amine compound may be 1 to 10, 1 to 8. , or 1 to 6. More specifically, the ratio [(OH)/($NH_2$)] of the number of moles of hydroxyl groups (OH) contained in the polyol compound to the number of moles of amine groups ($NH_2$) contained in the amine compound may be 1 to 4.

The polyol compound may contain two or more ester groups and one or more ether groups, along with two or more hydroxyl groups.

Specifically, the polyol compound may include one or more selected from polycaprolactone diol, poly(tetramethylene ether) glycol (PTMG), poly(propylene glycol) diol (PPG), poly(butylene adipate) diol (PBA), ethylene glycol, 1,3-propanediol, 2-methyl-1,3-propanediol, 1,3-butanediol, 1,4-butanediol, 1,6-hexanediol, 1,4-cyclohexanedimethanol, diethylene glycol, triethylene glycol, neopentyl glycol, dipropylene glycol, and hydroquinone-bis(β-hydroxyethyl) ether, and more specifically, the polyol compound may be polycaprolactone diol.

The amine compound may improve reaction and yield of the hydroxyl group provided at the end of the polyol compound and the (meth)acryloyl group compound by fixing the hydroxyl group, ester group, and ether group of the polyol compound during the process of reacting the polyol compound and the (meth)acryloyl group compound.

Specifically, the amine compound may include one or more selected from triethylamine, pyridine, N,N-diisopropylethylamine (DIEA), diethylamine, piperidine, pyrrolidine, N-methylmorpholine, 2,6-lutidine, 4-dimethylaminopyridine (DMAP), and imidazole, and more specifically, the amine compound may be triethylamine.

The (meth)acryloyl group compound may include one or more selected from acryloyl chloride and methacryloyl chloride.

In the first operation, the polyol compound and the amine compound may be mixed with a first reaction solvent to prepare a first mixture in a solution phase, and the (meth) acryloyl group may be mixed with a second reaction solvent to prepare a second mixture in a solution phase.

The first reaction solvent or the second reaction solvent may include one or more selected from tetrahydrofuran, acetonitrile (ACN), methanol, ethanol, propanol, isopropanol, N,N-dimethylformamide, N,N-dimethylacetamide, N-methylpyrrolidone, and 1,4-dioxane. Specifically, the first and second reaction solvents may be the same material, and more specifically, the first and second reaction solvents may be tetrahydrofuran.

The second operation may be performed in an inert gas atmosphere, specifically in an argon (Ar) gas atmosphere or a nitrogen ($N_2$) gas atmosphere. In the second operation, the first and second mixtures prepared in the first operation may be mixed and reacted, and for example, the second mixture may be added while maintaining the first mixture at −5° C. to 5° C. Specifically, the first mixture may be maintained at −3° C. to 5° C., −2° C. to 5° C., −1° C. to 5° C., −5° C. to 3° C., −5° C. to 2° C., −5° C. to 1° C., −2° C. to 2° C., or −0.5° C. to 0.5° C.

The (meth)acryloyl group compound may include one or more selected from acryloyl chloride and methacryloyl chloride.

In the second operation, purifying the intermediate product through column chromatography after the reaction is completed may be further included. Specifically, after extracting the intermediate product, the extracted material may be passed through column chromatography to remove residual substances remaining after the reaction, thereby further improving the reaction efficiency of the subsequent third operation.

In the third operation, drying in the vacuum oven is for removing the amine compound and the first to third reaction solvents, and may include performing first drying in a vacuum oven at 50° C. to 70° C. for 3 to 6 hours, and then performing second drying in a vacuum oven at 20° C. to 30° C. for 12 to 36 hours. The first drying and the second drying may be performed at different temperatures and times within the above-mentioned ranges, respectively, to prevent the physical properties of the reaction product from being deteriorated and more efficiently remove the amine compound or the first to third reaction solvents, thereby improving the purity of the reaction product. Specifically, the first drying may be performed at 55° C. to 65° C., or 60° C. Additionally, the second drying may be performed at 22° C. to 30° C., or for 25° C. for 24 hours.

The boron compound may include those represented by Formula 3 or Formula 4 below.

[Formula 3]

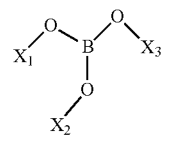

[Formula 4]

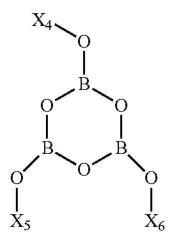

In Formula 3 or Formula 4, $X_1$ to $X_6$ are each independently a substituted or unsubstituted $C_1$-$C_{30}$ alkyl group, a substituted or unsubstituted $C_1$-$C_{30}$ haloalkyl group, or a substituted or unsubstituted $C_1$-$C_{30}$ hydroxyalkyl group.

Specifically, the boron compound may include one or more selected from trimethyl borate (TMB), trihydroxy boroxine, tris(2-methylpropene-1-yl) boroxine, and tris(dimethylamino)boroxine.

The third reaction solvent may include one or more selected from tetrahydrofuran, acetonitrile (ACN), methanol, ethanol, propanol, isopropanol, N,N-dimethylformamide, N,N-dimethylacetamide, N-methylpyrrolidone, and 1,4-dioxane. Specifically, the third reaction solvent may include acetonitrile (ACN).

In one embodiment of the present invention, the method for preparing a cross-linking agent for a quasi-solid electrolyte may be performed the first to third operations as follows. Specifically, in the first operation, polycaprolactone diol and triethylamine may be added in a tetrahydrofuran (THF) solvent and then stirred to prepare a first mixture, and prepare a second mixture having acryloyl chloride and 50 mL of tetrahydrofuran mixed therein. In the second operation, after adding the second mixture to the first mixture in an inert gas atmosphere while maintaining the first mixture at 0° C., the temperature is raised to room temperature, and then the mixture is stirred at room temperature for 15 hours to prepare an intermediate product. After extracting the intermediate product, it can be purified through column chromatography. In the third operation, the intermediate product is added to the acetonitrile (ACN) solvent in an inert gas atmosphere, and then trimethyl borate (TMB) is added, followed by first stirring at 50° C. for 3 hours. After completion of the first stirring, second stirring is performed at 70° C. for 2 hours in order to remove methanol, first drying is performed in a vacuum oven at 60° C. in order to remove trimethyl borate and residual solvent, and then second drying may be performed in a vacuum oven at 25° C. for 24 hours.

According to another aspect of the present invention, a quasi-solid electrolyte for a secondary battery including: the above-described cross-linking agent for a quasi-solid electrolyte of the present invention; a porous support; an alkali metal salt; a liquid electrolyte; and a thermal initiator.

The quasi-solid electrolyte for a secondary battery may be prepared by mixing a cross-linking agent for a quasi-solid electrolyte, an alkali metal salt, a liquid electrolyte, and a thermal initiator to prepare a liquid mixture, and then impregnating a porous support with the liquid mixture and applying heating at 50° C. to 80° C. for 1 to 5 hours. Specifically, a thermal initiator acts on the liquid mixture by heating, and the thermal initiator may cause the cross-linking agent for a quasi-solid electrolyte to react. The central boron (B) element contained in the quasi-solid electrolyte may be coordination-bonded to anions of the alkali metal salt in the liquid electrolyte.

The porous support may include a reticular structure with a porosity of 30% to 90% and a thickness of 10 μm to 200 μm. The porosity of the porous support may be 30% to 90%. If it is less than 30%, it is problematic since the amount that can contain the liquid mixture is too small, and if it exceeds 90%, the safety may be reduced since a short circuit is caused between the anode and the cathode during charging and discharging. The thickness of the porous support may be 10 μm to 200 μm. If it is less than 10 μm, a short circuit may occur due to contact between the cathode and the anode, and if it is more than 200 μm, resistance may increase and electrochemical performance may be reduced.

The porous support may be comprised of polyolefin-based resins such as polyethylene and polypropylene, fluorine-based resins such as polyvinylidene fluoride and polytetrafluoroethylene, polyester-based resins such as polyethylene terephthalate and polybutylene terephthalate, polyimide resins such as polyamideimide and polyetherimide, polyacrylonitrile resins, polysulfone-based resins such as polyethersulfone and polyphenylsulfone, polyketone-based resins such as polyetherketone and polyether ether ketone, and microporous films or non-woven fabrics made of cellulose-based materials.

The porous support may further include alumina ($Al_2O_3$). Alumina may further improve thermal stability and wettability in a porous support made of polymer. For example, alumina ($Al_2O_3$) may be contained in an amount of 1.5% by weight to 5% by weight, and if alumina is contained in an amount of less than 1.5% by weight, its effect is insignificant since the amount of alumina is too small, and if alumina is contained in an amount exceeding 5% by weight, the ion conductivity may be reduced. Specifically, the alumina may be 2% by weight to 5% by weight, 2% by weight to 4% by weight, or 2% by weight to 3% by weight.

The alkali metal salt may be a lithium salt or a sodium salt. In addition, the alkali metal salt may include a sodium cation or a lithium cation and any one anion of $BF_4$, $PF_6$, $ClO_4$, $CF_3SO_3$, $N(CF_3SO_2)_2$, $N(C_2F_5SO_2)_2$, $C(CF_2SO_2)_3$, and $BF_2(C_2O_4)$.

The liquid electrolyte may contain an organic solvent and an ionic liquid. The organic solvent includes one or more selected from ethylene carbonate, propylene carbonate, fluoroethylene carbonate, dimethyl carbonate, diethyl carbonate, ethyl methyl carbonate, dimethoxyethane, diethoxyethane, sulfolane, and 1,3-propanesultone.

The ionic liquid refers to a salt in a liquid state consisting only of ions, having a melting point of room temperature or lower. Specifically, the ionic liquid may be represented by Formula 5 below.

$X^+Y^-$ [Formula 5]

In Formula 5, X is a cation selected from the group consisting of imidazolium, ammonium, pyridinium, pyrazolium, piperidinium, triazolium, thiazolium, oxazolium, pyridazinium, pyrimidinium, pyrazinium, phosphonium, pyrrolidinium and sulfonium, and Y may be an anion selected from the group consisting of $BF_4$, $PF_6$, $ClO_4$, $CF_3SO_3$, $N(CF_3SO_2)_2$, $N(C_2F_5SO_2)_2$, $C(CF_2SO_2)_3$, $AsF_6$, $SbF_6$, $AlCl_4$, $NbF_6$, and $CF_3CO_2$.

The content ratios of the ionic liquid and the organic solvent contained in the mixture of the ionic liquid and the organic solvent may be composed at a weight ratio of 0.01 to 99% by weight: 0.1 to 99% by weight, respectively. The ionic liquid and the organic solvent are mixed within the above-mentioned range so that the ionic conductivity, which is a disadvantage of the ionic liquid, may be prevented from being lowered, and the flame retardancy, which is a disadvantage of the organic solvent, may be complemented to improve the electrochemical properties and stability of the secondary battery.

The thermal initiator may include one or more selected from t-amyl peroxide, benzoyl peroxide, lauroyl peroxide, t-butyl peroxypivalate, 1,1'-bis-(bis-t-butylperoxy)cyclohexane, 2,2'-azobisisobutyronitrile (AIBN), 2,2'-azobis-(2,4-dimethylvaleronitrile), 2,2'-azobis-(4-methoxy-2,4-dimethylvaleronitrile), 2-cyano-2-propylazoformamide, 1,1'-azobis(cyclohexane-1-carbonitrile), and 2,2'-azobis(2-methylbutyronitrile).

The cross-linking agent for a quasi-solid electrolyte may be contained in an amount of 1 to 12 parts by weight based on 100 parts by weight of the total amount of the liquid mixture of the cross-linking agent for a quasi-solid electrolyte, an alkali metal salt, a liquid electrolyte, and a thermal initiator. If the cross-linking agent for a quasi-solid electrolyte is contained in an amount of less than 1 part by weight, it is difficult to improve ionic conductivity, and if it is contained in an amount exceeding 10 parts by weight, the viscosity of the electrolyte may increase too high to increase resistance. Specifically, the cross-linking agent for a quasi-solid electrolyte may be contained in an amount of 2 to 8 parts by weight or 2 to 5 parts by weight based on 100 parts by weight of the total amount of the liquid mixture.

According to another aspect of the present invention, embodiments of the present invention may include a secondary battery including: a cathode; an anode; and the above-described quasi-solid electrolyte for a secondary battery; which is interposed between the cathode and the anode. The secondary battery may be a lithium-ion secondary battery or a sodium-ion secondary battery.

Hereinafter, Examples and Comparative Examples of the present invention will be described. However, the following Examples are only preferred examples of the present invention and the scope of rights of the present invention is not limited by the following Examples.

1. Electrical Conductivity and Electrochemical Stability of Liquid Electrolyte and Ionic Liquid Electrolyte Preparation Example 1 (Liquid Electrolyte)

Preparation Example 1 was prepared by dissolving a sodium bis(fluorosulfonyl)imide (NaFSI) salt with a concentration of 0.5 M in a solution in which 1-butyl-1-methylpyrrolidinium bis(trifluoromethylsulfonyl)imide (BMPTFSI), fluoroethylene carbonate (FEC), and 1,3-propanesultone (PS) were mixed at a volume ratio of 8:1:1 as a liquid electrolyte in which an ionic liquid and an organic solvent were mixed.

Preparation Example 2 (Ionic Liquid Electrolyte)

Preparation Example 2 was prepared by dissolving a sodium bis(fluorosulfonyl)imide (NaFSI) salt with a concentration of 0.5 M in 1-butyl-1-methylpyrrolidinium bis (trifluoromethylsulfonyl)imide (BMPTFSI) as an ionic liquid electrolyte.

Figure 2A:
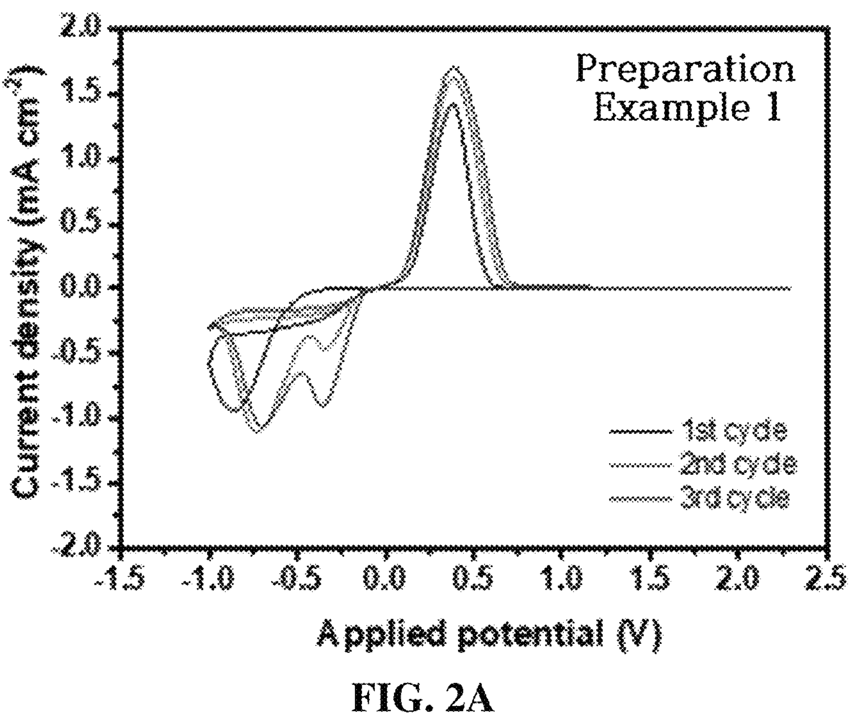
FIGS. 2A and 2B show results of evaluating the reversibility of the electrodeposition/desorption behaviors of sodium using cyclic voltammetry (CV) of Preparation Example 1 and Preparation Example 2.
Figure 2B:
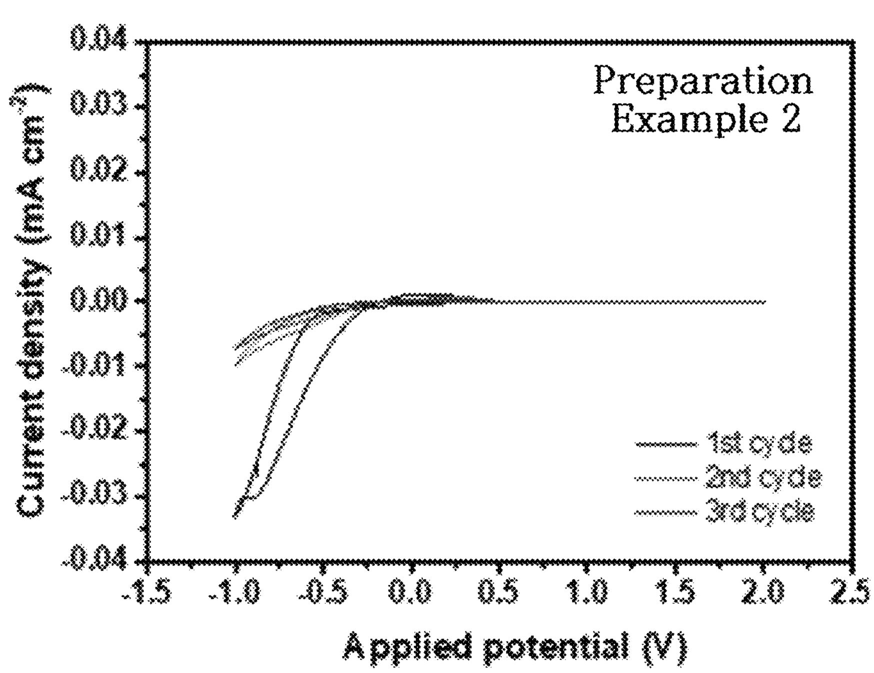

FIGS. 1A and 1B show results of evaluating ionic conductivities (FIG. 1A) of Preparation Example 1 and Preparation Example 2 and electrochemical stabilities (FIG. 1B) using linear sweep voltammetry (LSV) thereof. FIGS. 2A and 2B show results of evaluating the reversibility of the electrodeposition/desorption behaviors of sodium using cyclic voltammetry (CV) of Preparation Example 1 and Preparation Example 2.

Referring to FIGS. 1A and 1B, it could be checked that the ionic conductivity of Preparation Example 1 was 3.4 mS $cm^{-1}$ and that of Preparation Example 2 was 1.7 mS $cm^{-1}$, and it could be confirmed that Preparation Example 1 showed a higher value than Preparation Example 2. That is, Preparation Example 1 further includes an organic solvent compared to Preparation Example 2, which consists of an ionic liquid electrolyte and a sodium salt, so that Preparation Example 1 is judged to lower the viscosity of the electrolyte and make the transfer of ions in the electrolyte smoother.

As a result of checking the electrochemical stabilities of Preparation Example 1 and Preparation Example 2 using linear sweep voltammetry (LSV), it could be confirmed that both Preparation Example 1 and Preparation Example 2 exhibited excellent electrochemical stabilities of 5.0 V vs. $Na/Na^+$ or more.

In FIGS. 2A and 2B, the peak current observed around 0 V means that electrodeposition of sodium occurs, and the peak current shown around 0.5 V means that desorption of sodium occurs. From the fact that Preparation Example 2 showed a higher peak current than Preparation Example 1, it could be confirmed that the reversibility of sodium electrodeposition and desorption was shown to be higher in Preparation Example 1. In other words, when an organic solvent is further included as in Preparation Example 1, it is judged that the ionic conductivity is improved, thereby promoting the electrodeposition/desorption behavior of sodium.

That is, when synthesizing the reversibility evaluation of ionic conductivity, electrochemical stability, and sodium electrodeposition/desorption, Preparation Example 1 was judged to be more suitable for use in sodium batteries than Preparation Example 2, and thus Preparation Example 1 was applied to the quasi-solid electrolyte.

2. Preparation of Porous Support and Cross-Linking Agent for Quasi-Solid Electrolyte Preparation Example 3 (Porous Support)

FIGS. 3A, 3B and 3C are a diagram (FIG. 3A) schematically showing a method for preparing a porous polyamide-imide support using electrospinning, an electron micrograph (FIG. 3B) for the prepared porous support, and (FIG. 3C) a view showing the distribution of an aluminum element contained in the prepared porous support.

In order to use as a porous support for a quasi-solid electrolyte, a polyamideimide (PAI) polymer was electrospun and manufactured into a non-woven fabric. Referring to FIG. 3A, 17.5% by weight of polyamideimide was added to a N,N-dimethylacetamide (DMAc) solvent, and stirred at a temperature of 60° C. to be completely dissolved. 2.5% by weight of alumina ($Al_2O_3$) was added thereto in order to improve the thermal stability and wettability of the porous support to prepare a PAI solution. The prepared PAI solution was spun using an electrospinning method and manufactured into a porous support with a thickness of 150 μm in the form of non-woven fabric.

Here, electrospinning was performed using the following method. When a positive (+) charge is applied to the dual structure nozzle filled with the PAI solution, a negative (−) charge is applied to a target part located on the opposite side of a nozzle, and a voltage is applied, an electric field is formed in the nozzle and the target part. When the PAI solution is spun through a nozzle, a charge or dipole orientation is induced on the surface of the hemispherical droplet at the interface between the air layer and the solution, and a force opposing the surface tension is generated due to charge or dipole repulsion. Therefore, the hemispherical surface of the PAI solution hanging at the end of the capillary is stretched into a conical shape, and the charged PAI solution is released from the tip of the cone while the attraction or repulsive electrostatic force overcomes the surface tension at a predetermined critical electric field strength. The spun PAI solution adheres and accumulates in the form of a mesh on the opposite target part. At this time, the polymer mesh continuously passes through the polymer spraying region through the target part roller to form a non-woven fabric. In the electrospinning, a porous support was prepared while maintaining an applied voltage of 18 kV, a PAI solution supply rate of 0.5 ml/hour, and a target part roller rotation speed of 100 rpm.

Referring to FIG. 3B, it could be confirmed that the fiber form was manufactured as a porous support of PAI polymer organized in a reticular structure. Referring to FIG. 3B, it could be confirmed that the added alumina was uniformly distributed on the surface of the porous support as a whole. Here, PAI has excellent heat resistance properties and improves the thermal properties of the electrolyte in the secondary battery.

Preparation Example 4 (Cross-Linking Agent for Quasi-Solid Electrolyte)

Figure 4:
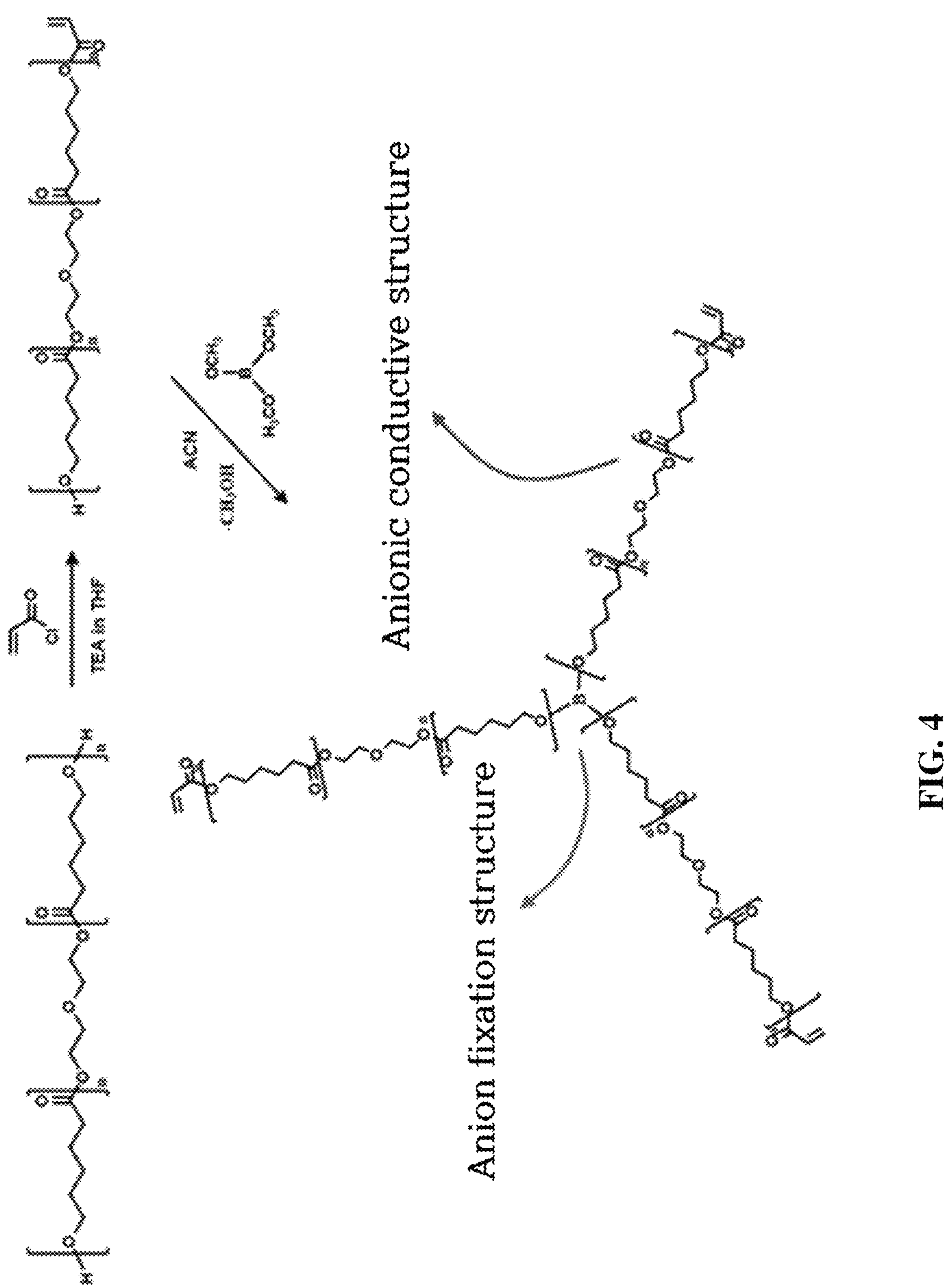
FIG. 4 schematically shows a preparation process of a cross-linking agent for a quasi-solid electrolyte.

FIG. 4 schematically shows a preparation process of a cross-linking agent for a quasi-solid electrolyte.

Figures 5A, 5B:
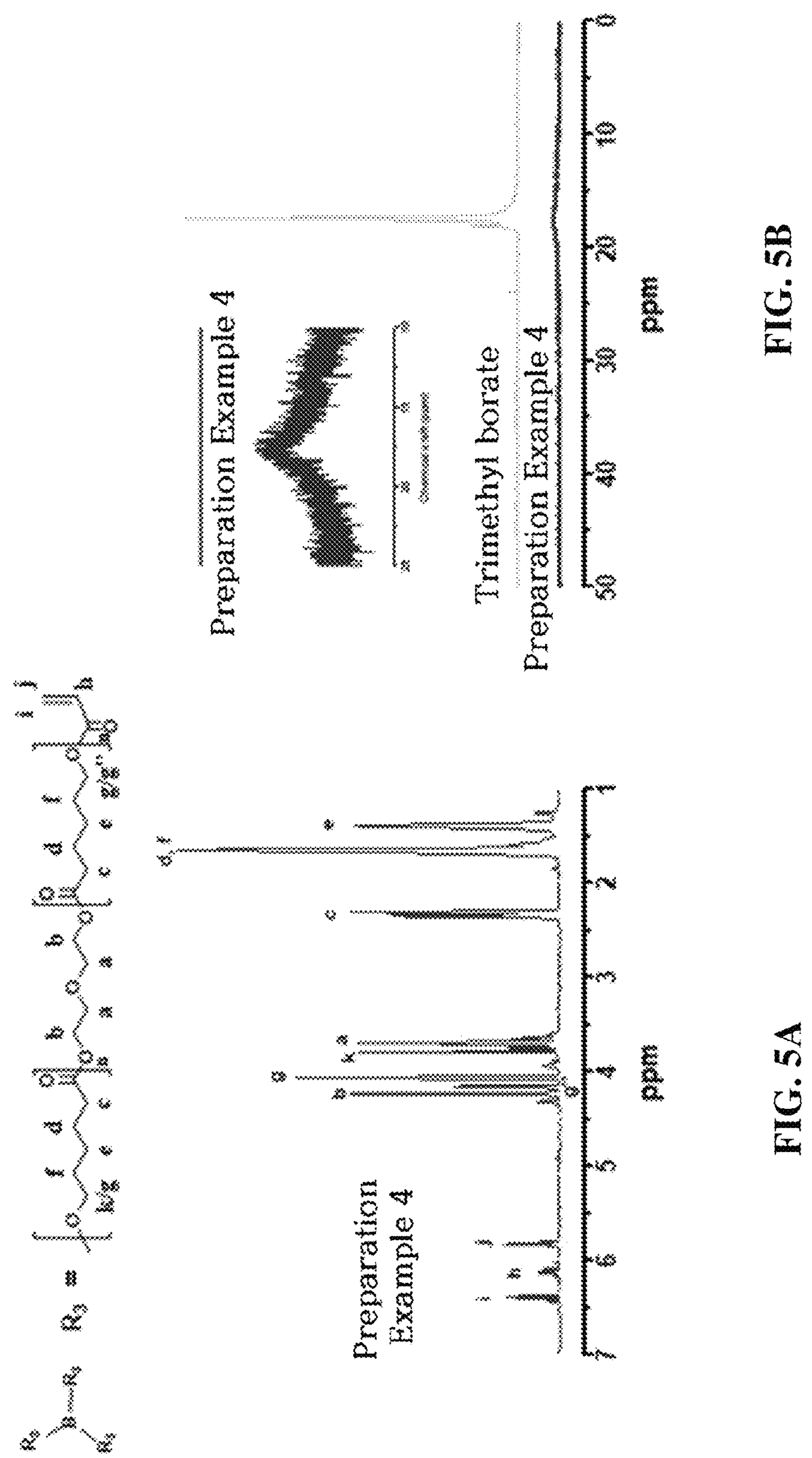
FIGS. 5A and 5B show results of $^1H$ NMR analysis (FIG. 5A) and $^{11}B$ NMR analysis (FIG. 5B) of the cross-linking agent for a quasi-solid electrolyte prepared according to FIG. 4.

Referring to FIG. 4, in the first operation, 20.0 g and 3.05 g of polycaprolactone diol and triethylamine, respectively, were mixed in 120 mL of a tetrahydrofuran (THF) solvent. The temperature of the reactor containing the mixed solution was maintained at 0° C., and an argon atmosphere was formed. After a solution having 2.73 g of acryloyl chloride and 50 mL of THF mixed therein was slowly injected thereinto, the temperature was raised from 0° C. to room temperature, and then the mixture was stirred at room temperature for 15 hours to prepare an intermediate product. After the reaction was completed, the intermediate product was purified using extraction and column chromatography. In the second operation, 1.17 g of the intermediate product prepared in the first operation was mixed with 20 mL of an acetonitrile (ACN) solvent to form an argon atmosphere. 0.07 mL of trimethyl borate (TMB) was slowly added thereto, and then stirred at 50° C. for 3 hours. Subsequently, after the reaction was completed, the mixture was further stirred at 70° C. for 2 hours to remove methanol generated as a by-product. Unreacted TMB and remaining solvent were removed in a vacuum oven at 60° C., and then the mixture was subsequently dried in a vacuum oven at 25° C. for 24 hours to prepare a cross-linking agent for a quasi-solid electrolyte. The prepared cross-linking agent for a quasi-solid electrolyte is formed in a structure that improves cation mobility, contains boron (B) at the center, and may include one or more polyester structures bonded to the boron. FIGS. 5A and 5B show results of $^{1}H$ NMR analysis (FIG. 5A) and $^{11}B$ NMR analysis (FIG. 5B) of the cross-linking agent for a quasi-solid electrolyte prepared according to FIG. 4.

3. Preparation of Quasi-Solid Electrolyte

Preparation Example 5

Figure 6:
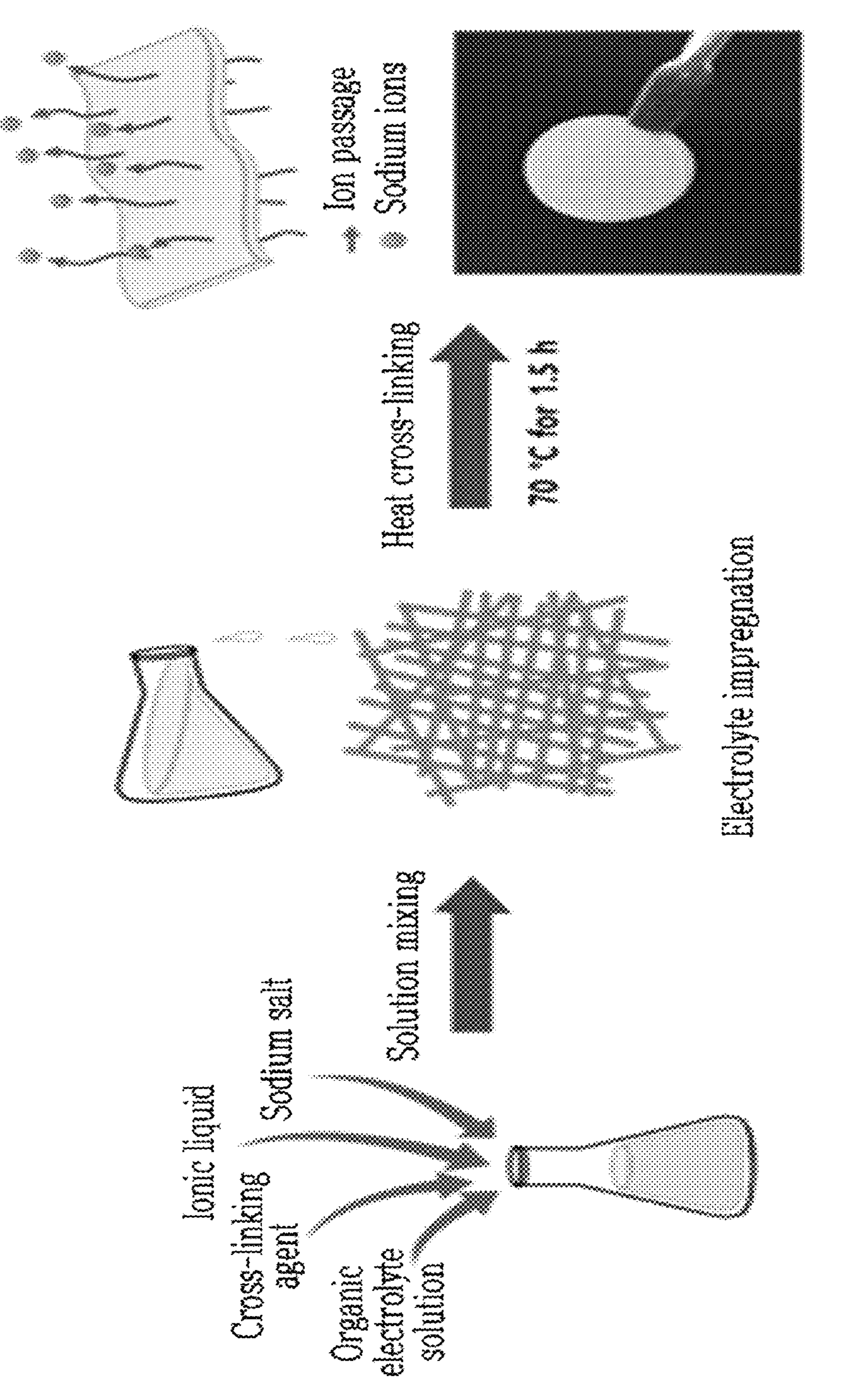
FIG. 6 schematically shows a method for preparing a quasi-solid electrolyte using a porous support and a cross-linking agent for a quasi-solid electrolyte.

FIG. 6 schematically shows a method for preparing a quasi-solid electrolyte using the porous support and the cross-linking agent for a quasi-solid electrolyte described above.

After impregnating the porous support prepared according to Preparation Example 3 using 97% by weight of a liquid electrolyte according to Preparation Example 1 having 1-butyl-1-methylpyrrolidinium bis(trifluoro methylsulfonyl)imide (BMPTFSI), fluoroethylene carbonate (FEC), and 1,3-propanesultone (PS) mixed at a volume ratio of 8:1:1 and containing sodium bis(fluorosulfonyl)imide (NaFSI) salt at a concentration of 0.5 M, 3% by weight of a cross-linking agent for a quasi-solid electrolyte according to Preparation Example 4, and Azobis(isobutyronitrile) (AIBN) (1% by weight of the cross-linking agent for a quasi-solid electrolyte) as a thermal initiator, it was heat-crosslinked at 70° C. for 1 hour and 30 minutes to be prepared in an in situ form.

Preparation Example 6

In Preparation Example 6, a quasi-solid electrolyte was prepared in the same manner as Preparation Example 5 except that a glycol-based cross-linking agent (ethoxylated trimethylolpropane triacrylate, ETPTA) was used as a cross-linking agent instead of the cross-linking agent for a quasi-solid electrolyte prepared according to Preparation Example 4.

TABLE 1

| Classification | Preparation Example 5 | Preparation Example 6 |
|---|---|---|
| Liquid electrolyte | 1-Butyl-1-methylpyrrolidinium bis(trifluorometh-ylsulfonyl)imide:fluoroethylene carbonate:1,3-propanesultone | 1-Butyl-1-methylpyrrolidinium bis(trifluorometh-ylsulfonyl)imide:fluoroethylene carbonate:1,3-propanesultone |
| Salt | Sodium bis(fluorosulfonyl)imide | Sodium bis(fluorosulfonyl)imide |
| Porous support | PAI electrospinning | PAI electrospinning |
| Thermal initiator | Azobis(isobutyronitrile) (AIBN) | Azobis(isobutyronitrile) (AIBN) |
| Cross-linking agent | Preparation Example 4 (Cross-linking agent for quasi-solid electrolyte) | Glycol-based cross-linking agent |

4. Evaluation of Ion Conduction Properties of Liquid Electrolyte and Quasi-Solid Electrolyte Ion conductivities were respectively measured for Preparation Example 1 (liquid electrolyte), Preparation Example 5 (quasi-solid electrolyte using the cross-linking agent of Preparation Example 4), and Preparation Example 6 (quasi-solid electrolyte using glycol cross-linking agent), and the activation energy required for ion transfer within each of the electrolyte was calculated. Ion conductivities in the respective electrolytes were calculated using Vogel-Tammann-Fulcher (VTF) behavior expressed in <Equation 1> below.

$$\sigma = AT^{-1/2}\exp\{-E_a/R(T-T_0)\}$$ <Equation 1>

In Equation 1, $\sigma$ is the ionic conductivity of the electrolyte, A is the frequency factor, $E_a$ is the activation energy, R is the gas constant, T is the current temperature, and $T_0$ is the reference temperature, and means a value usually about 10K to 50K lower than the glass transition temperature.

Figure 7:
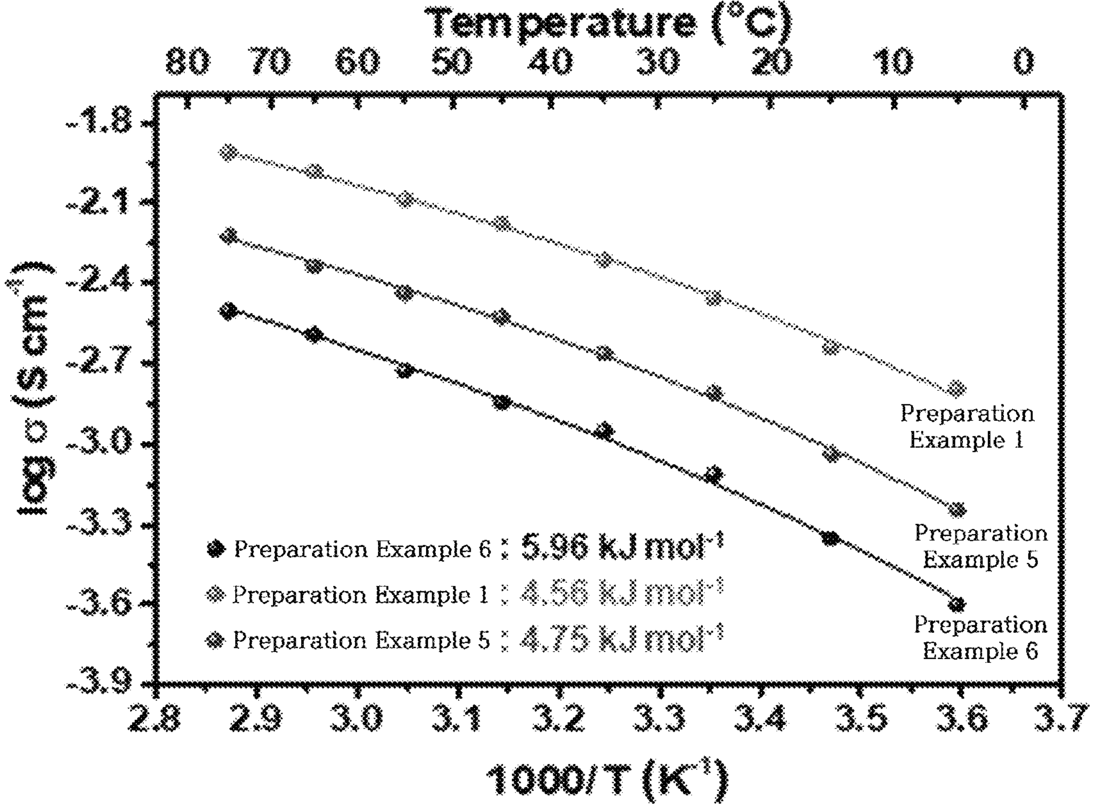
FIG. 7 is a graph showing ionic conductivities and activation energies by temperatures for Preparation Example 1, Preparation Example 5, and Preparation Example 6.

Referring to FIG. 7, Preparation Example 1, which is an electrolyte made of liquid, has the lowest activation energy value of 4.56 kJ $mol^{-1}$. This is believed to be because it further contains an organic solvent, and thus the viscosity of the electrolyte is lowered, and due to this, ion transfer has been smoothened. Preparation Example 5 and Preparation Example 6 are quasi-solid electrolytes prepared using different cross-linking agents respectively. It could be confirmed that Preparation Example 6 showed a relatively high activation energy value of 5.96 kJ $mol^{-1}$ due to low flowability, whereas Preparation Example 5 showed an activation energy of 4.75 kJ $mol^{-1}$. That is, although it was a quasi-solid electrolyte, Preparation Example 5 showed an activation energy similar to that of Preparation Example 1, which was a liquid electrolyte, and this is believed to be because the polyester structure improved the mobility of sodium cations by using the cross-linking agent according to Preparation Example 4, and obstruction of the movement passage of the sodium cations is prevented by allowing the electromagnetic empty orbital of the boron atom contained in the center to fix anions in the electrolyte.

Figure 8:
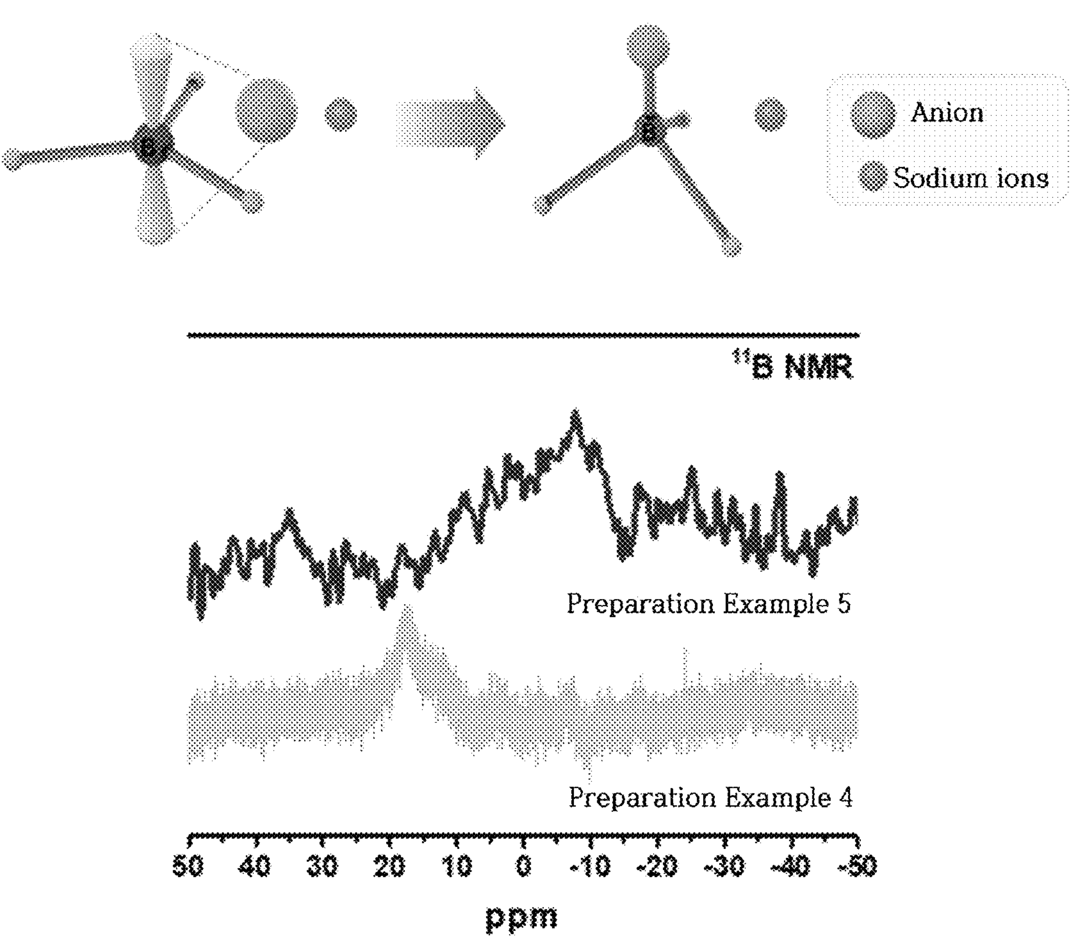
FIG. 8 shows results of checking the anion coordination bonding abilities of Preparation Example 4 and Preparation Example 5 through solid-phase $^{11}B$ NMR analysis.

FIG. 8 shows results of checking the anion coordination bonding abilities of Preparation Example 4 and Preparation Example 5 through solid-phase $^{11}$B NMR analysis.

Referring to FIG. 8, it could be confirmed that Preparation Example 4 showed a peak due to boron around 18 ppm. On the other hand, it could be confirmed that a peak due to boron was observed around −8 ppm in Preparation Example 5, where a quasi-solid electrolyte was prepared using Preparation Example 4 as a cross-linking agent. This is believed to be because boron of Preparation Example 4, which was contained as a cross-linking agent in Preparation Example 5, was coordination-bonded to anions in the electrolyte, and accordingly the electron density around boron was increased to shift the peak.

Figure 9:
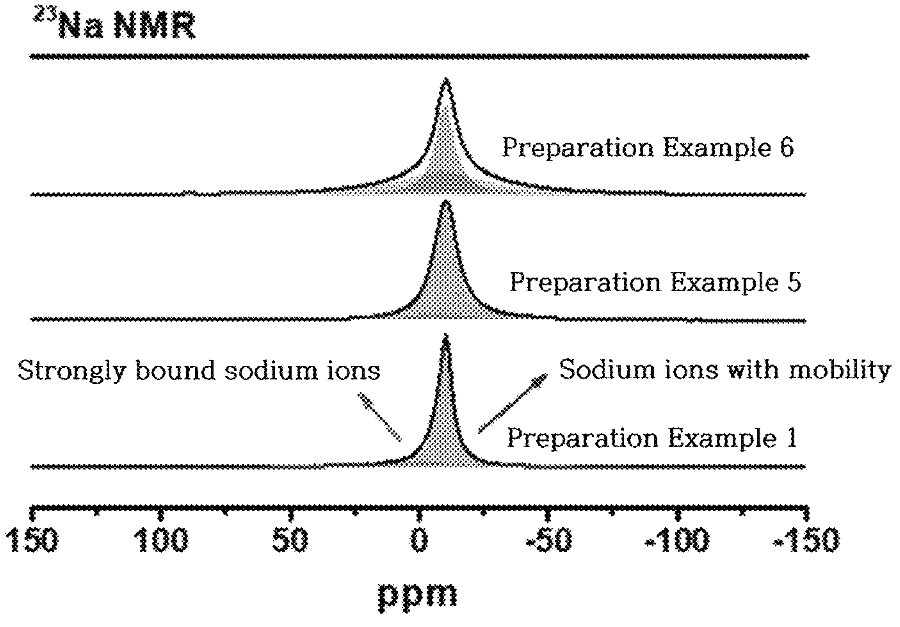
FIG. 9 shows results of comparing the cation mobilities of Preparation Example 1, Preparation Example 5, and Preparation Example 6 through solid-phase $^{23}Na$ NMR analysis.

FIG. 9 shows results of comparing the cation mobilities of Preparation Example 1, Preparation Example 5, and Preparation Example 6 through solid-phase $^{23}$Na NMR analysis.

Referring to FIG. 9, the effect of the anion coordination bonding ability of boron in Preparation Example 4 on the mobility of sodium cations in the quasi-solid electrolyte was confirmed. In the NMR spectra of FIG. 9, the linewidths of the peaks indicate the mobilities of sodium cations, the area (red) of the peak with a relatively wide linewidth means a low amount of sodium ions having low mobility by being strongly bound to sodium ions, and the area (blue) of the peak with a narrow linewidth means a high amount of sodium ions with high mobility.

Since Preparation Example 6 is a quasi-solid electrolyte with no flowability, it could be confirmed that the proportion of strongly bound sodium cations was shown to be higher than that of sodium cations with high mobility. On the other hand, in the case of a liquid electrolyte as in Preparation Example 1, the proportion of sodium cations with high mobility was shown to be higher than that of strongly bound sodium cations. Although Preparation Example 5 was a quasi-solid electrolyte without flowability, it could be confirmed that the proportion of sodium cations with high mobility was shown to be higher than Preparation Example 1, which was a liquid electrolyte.

That is, this is believed to be because the cross-linking agent of Preparation Example 5 is coordination-bonded to anions by a boron atom at the center and improves the conduction of sodium cations due to the polyester structure in the cross-linking agent.

Table 2 below shows results of measuring cation mobilities of Preparation Example 1, Preparation Example 5, and Preparation Example 6 using alternating current impedance and direct current polarization measurements.

TABLE 2

| Classification | Cation mobility |
| --- | --- |
| Preparation Example 1 | 0.16 |
| Preparation Example 5 | 0.52 |
| Preparation Example 6 | 0.18 |

Referring to Table 2, it could be confirmed that Preparation Example 1 and Preparation Example 6 showed low cation mobilities of 0.2 or less, whereas Preparation Example 5 showed high cation mobility of 0.52. As described above, this is believed to be because Preparation Example 5 is due to the improvement in sodium cation mobility caused by the polyester structure contained in the cross-linking agent and the effect caused by anion coordination bonding due to boron, and it could be confirmed that such results tend to be consistent with the solid-phase $^{23}$Na NMR analysis results reviewed in FIG. 9.

Figure 10:
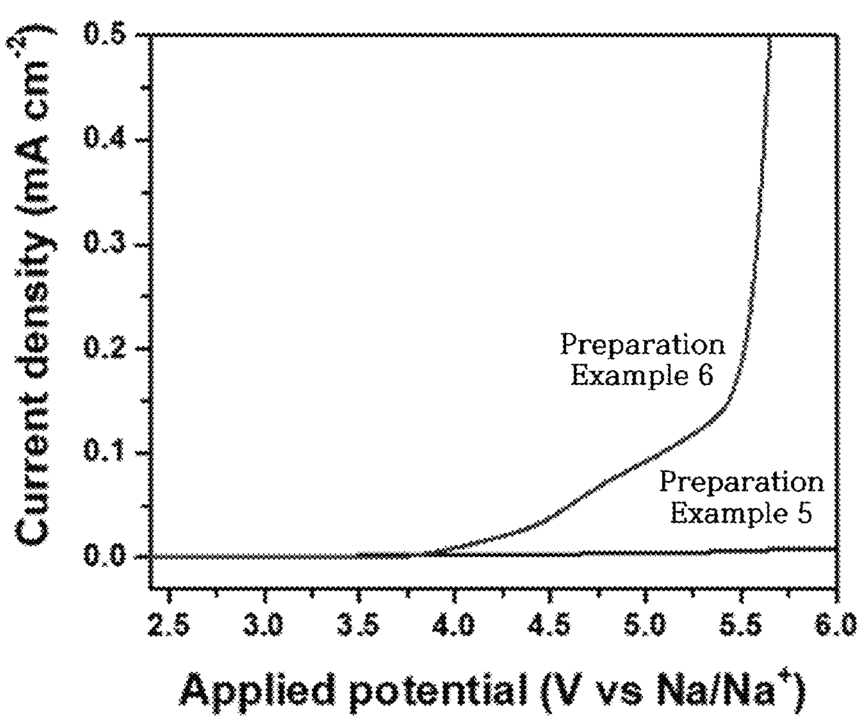
FIG. 10 is a graph comparing the electrochemical stabilities of Preparation Example 5 and Preparation Example 6.

FIG. 10 is a graph comparing the electrochemical stabilities of Preparation Example 5 and Preparation Example 6.

In FIG. 10, the electrochemical stabilities of Preparation Example 5 and Preparation Example 6 were evaluated through LSV analysis. It could be confirmed that in Preparation Example 6, oxidative decomposition began to occur from a voltage of 4.0 V or lower, but Preparation Example 5 showed excellent oxidation stability without oxidative decomposition being occurred even at 5.0 V or higher. That is, it is believed that the polyester structure of Preparation Example 5 has more excellent cation conductivity since the cross-linking agent of Preparation Example 5 contains a polyester structure that improves cation mobility, and the glycol-based cross-linking agent of Preparation Example 6 is formed in a polyether structure.

Therefore, the sodium-ion secondary battery has an operating voltage of 2.0 to 4.3 V, and it could be confirmed that there would be no problem even if applied since it was stable within the operating voltage of the sodium-ion secondary battery in the case of Preparation Example 5.

Figure 11:
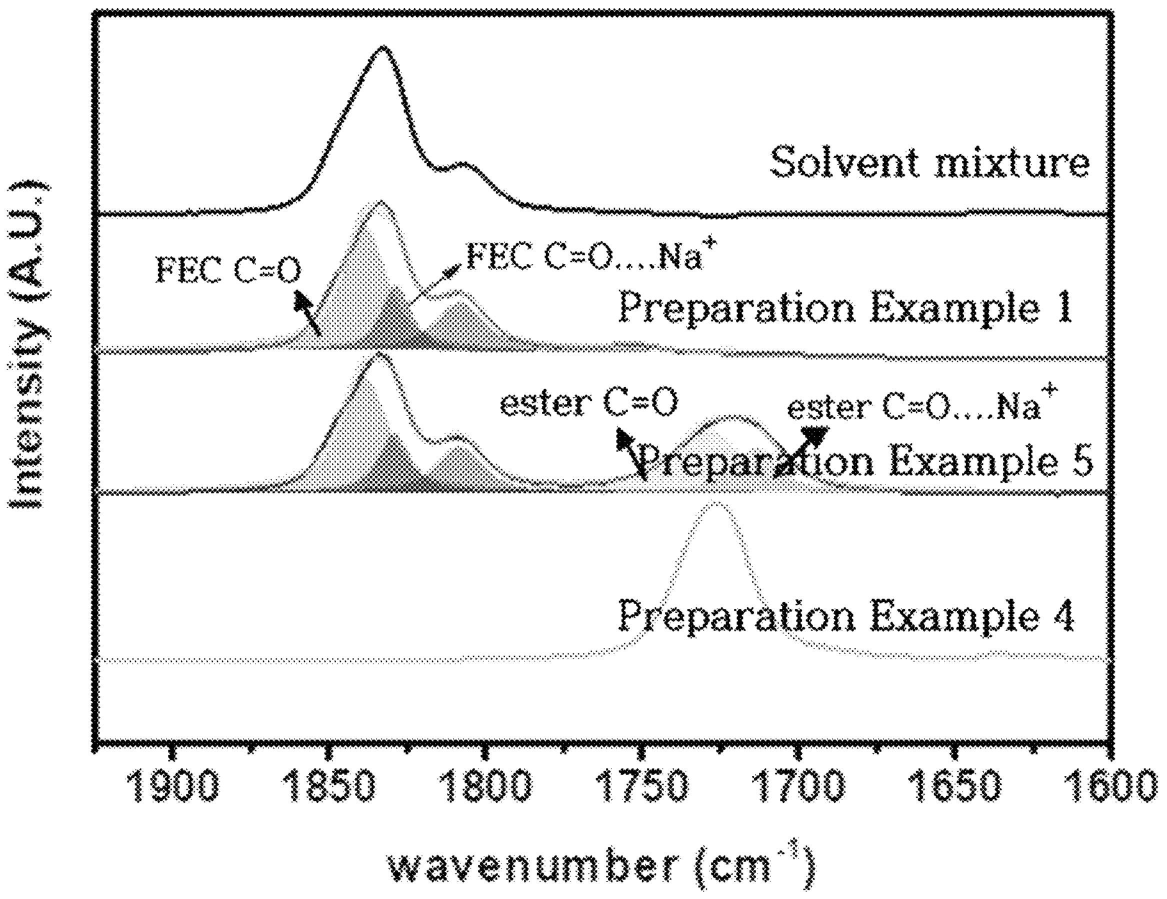
FIG. 11 shows results of checking the secondary bond between the polyester structure and sodium cations in the cross-linking agent using infrared spectroscopy.

FIG. 11 shows results of checking the secondary bond between the polyester structure and sodium cations in the cross-linking agent using infrared spectroscopy.

Referring to FIG. 11, for each solvent mixture used as a reference, the respective sodium cations and secondary bonds of Preparation Example 1 (liquid electrolyte), Preparation Example 4 (cross-linking agent), Preparation 5 (quasi-solid electrolyte using the cross-linking agent of Preparation Example 4) were confirmed. Here, the solvent mixture is a mixture of 1-butyl-1-methylpyrrolidinium bis(trifluoromethylsulfonyl)imide:fluoroethylene carbonate:1,3-propanesultone at a volume ratio of 8:1:1.

Referring to FIG. 11, it could be confirmed that a cross-linking agent with a polyester structure is used so that the polyester structure in the cross-linking agent contains oxygen that can provide electrons to the carbonyl group (C=O), and this oxygen is secondarily bonded to the sodium cations. In addition, it could be confirmed that sodium cations move if the polymer chain of the cross-linking agent undergoes segmental movement. It could be confirmed that the polyester structure in the cross-linking agent and sodium cations are secondarily bonded using infrared spectroscopy, and this means that the polyester structure in the cross-linking agent is secondarily bonded to sodium cations to additionally dissociate the sodium salt, and sodium cations promote movement through segmental movement of the polymer cross-linking agent.

Figure 12B:
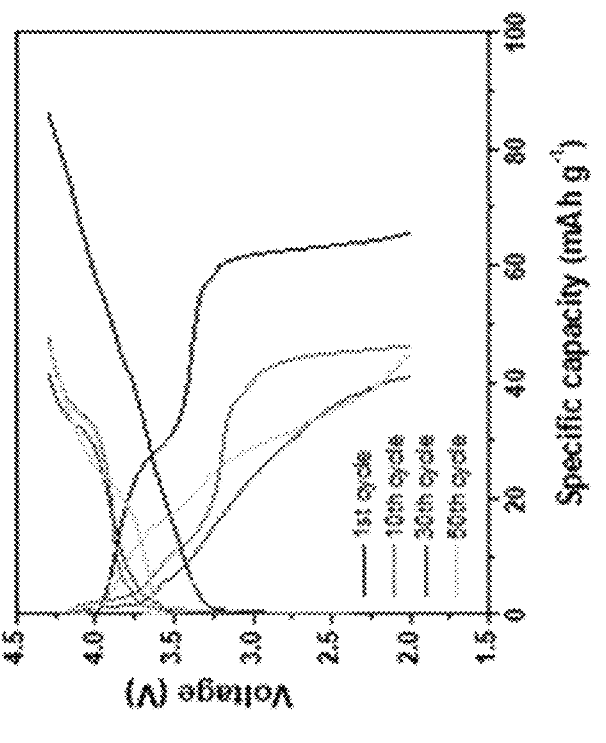
FIGS. 12A, 12B and 12C are graphs showing the voltage curves in the charge and discharge cycles of Preparation Example 5 (FIG. 12A) and Preparation Example 6 (FIG. 12B) and the cycle characteristics (FIG. 12C) of Preparation Example 5 and Preparation Example 6.
Figure 12B:
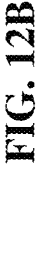
Figure 12A:
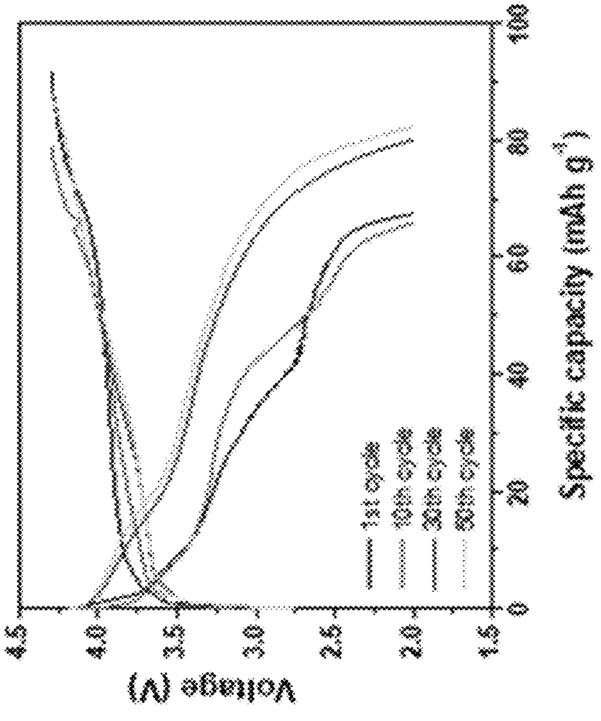
Figure 12C:
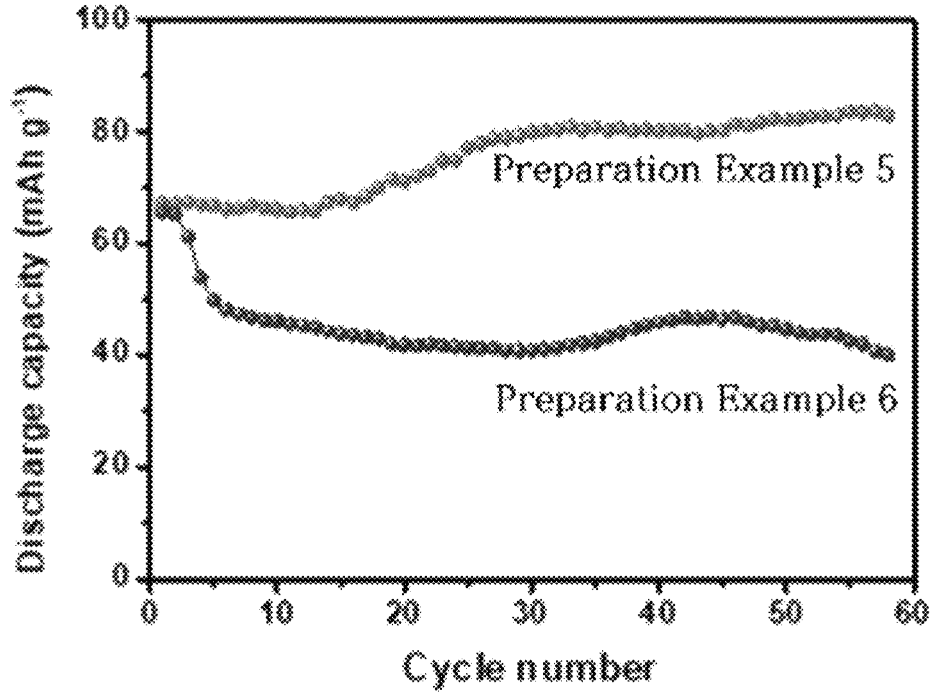

FIGS. 12A, 12B and 12C are graphs showing the voltage curves in the charge and discharge cycles of Preparation Example 5 (FIG. 12A) and Preparation Example 6 (FIG. 12B) and the cycle characteristics (FIG. 12C) of Preparation Example 5 and Preparation Example 6.

In FIGS. 12A, 12B and 12C, sodium-ion secondary batteries were manufactured using Preparation Example 5 and Preparation Example 6 as the electrolyte. In this case, the sodium-ion secondary batteries were manufactured using sodium metal as the anode and $Na_3V_2(PO_4)_2F_3$ as the cathode. Subsequently, charging and discharging were performed at room temperature using the manufactured sodium-ion secondary batteries at a current density of 0.1 C in a voltage range of 2.0 to 4.3 V.

Preparation Example 5 showed stable capacity maintenance after the discharge capacity increased as the charge/ discharge cycle continued. On the other hand, it could be confirmed that the capacity continued to decrease as the charge/discharge cycle progressed in Preparation Example 6. This is believed to be because a cross-linking agent that improves the mobility of cations was used in Preparation Example 5 to improve the mobility of sodium cations, thereby promoting the electrochemical reaction of the secondary battery and obtaining such excellent charge and discharge characteristics. In other words, when an in-situ quasi-solid electrolyte such as Preparation Example 5 is applied to a sodium-ion secondary battery, it means that the excellent electrochemical performance of the secondary battery can be maintained, and the safety thereof can be improved.

Figures 13A, 13B:
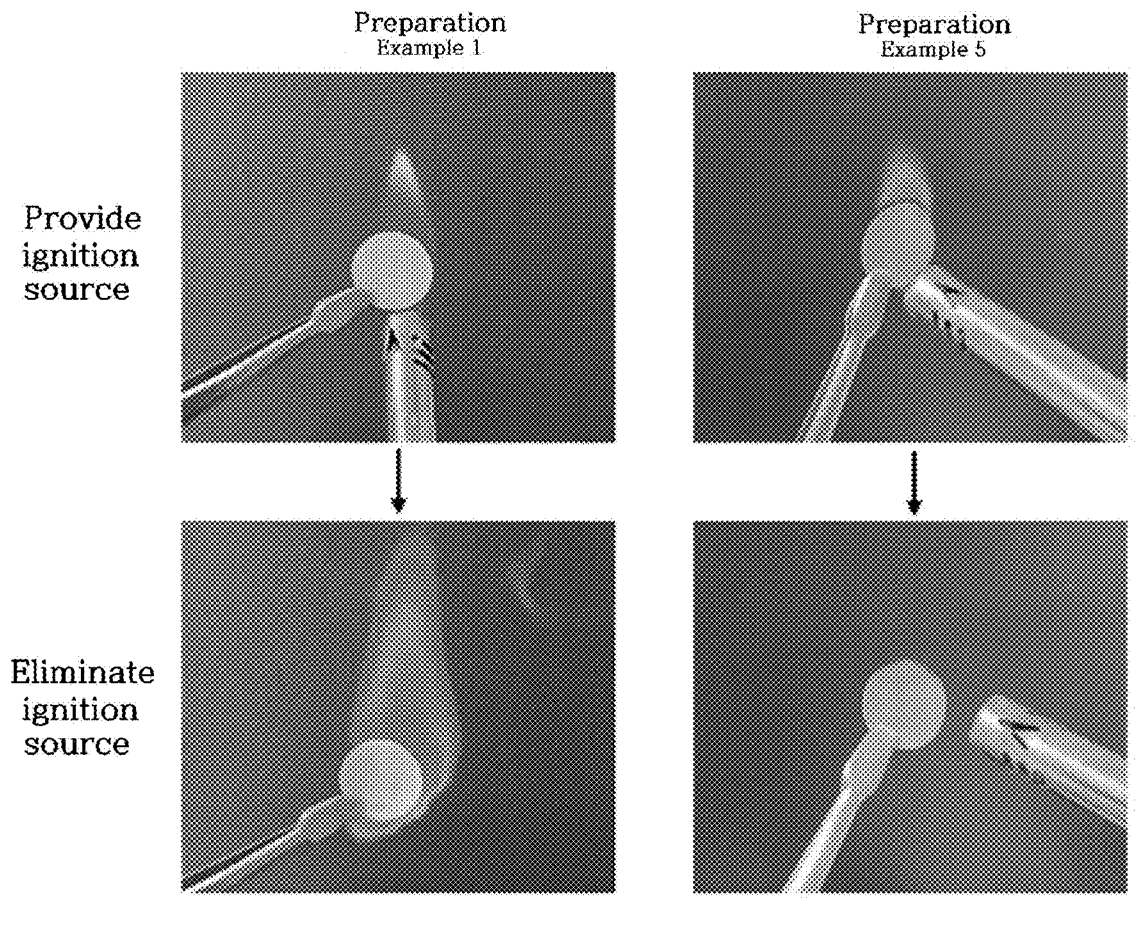
FIGS. 13A and 13B show results of checking whether Preparation Example 1 and Preparation Example 5 were ignited or not.

FIGS. 13A and 13B show results of checking whether Preparation Example 1 and Preparation Example 5 were ignited or not.

Flame retardant properties were confirmed by directly applying fire to Preparation Example 1 and Preparation Example 5 and comparing the degrees of ignition. As shown in FIGS. 13A and 13B, Preparation Example 1 shows immediate and large ignition since it contains a flammable organic solvent. Meanwhile, Preparation Example 5 showed a result of non-ignition since it contained an ionic liquid with flame retardancy and the organic solvent was trapped within the polymer network in the quasi-solid polymer electrolyte. In other words, it could be confirmed that the quasi-solid electrolyte such as Preparation Example 5 has improved safety compared to the organic liquid electrolyte of Preparation Example 1, which means that the safety of the battery can be improved when applied to a secondary battery.

Figure 14A:
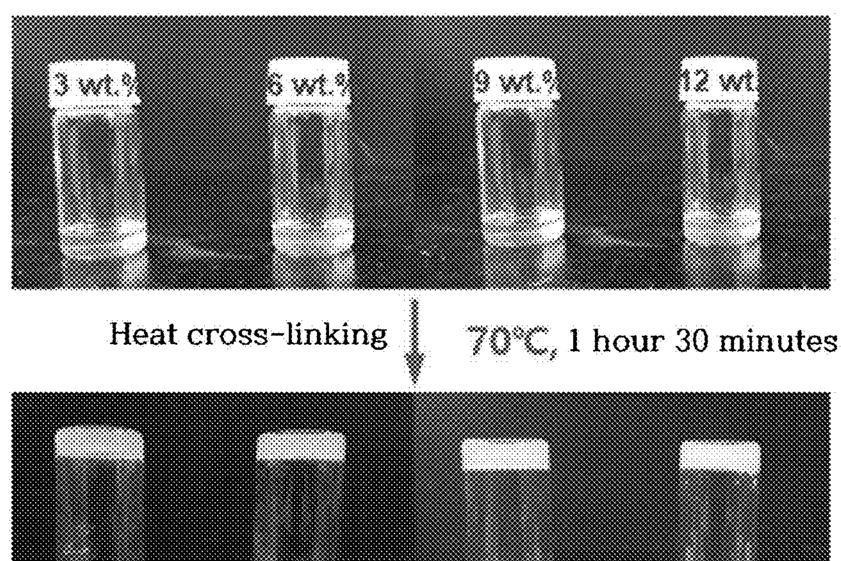
FIGS. 14A and 14B show results of checking the ionic conductivities of the all-solid electrolytes prepared by varying the concentration of the cross-linking agent prepared according to Preparation Example 4.
Figure 14B:
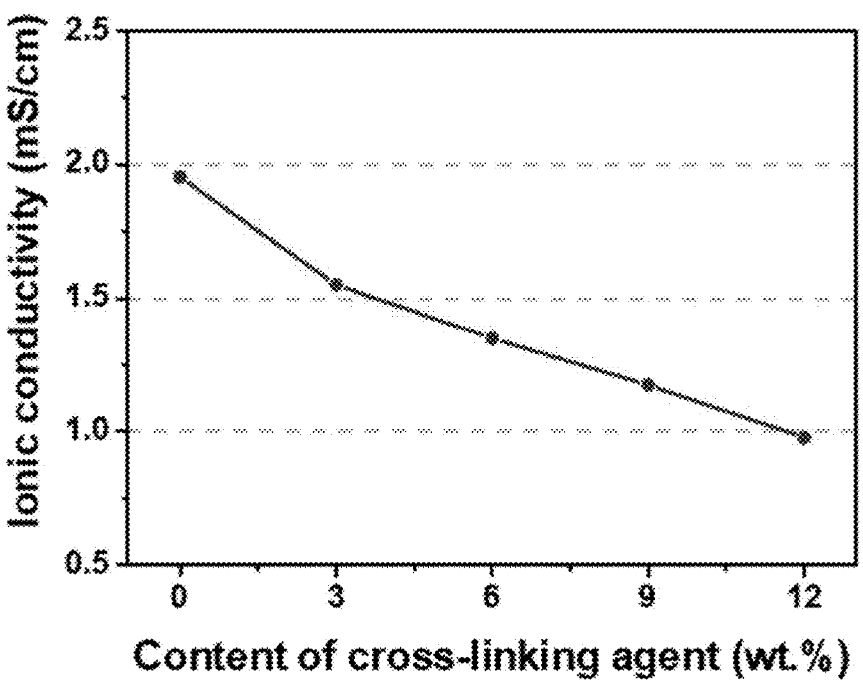

FIGS. 14A and 14B show results of checking the ionic conductivities of the all-solid electrolytes prepared by varying the concentration of the cross-linking agent prepared according to Preparation Example 4.

All-solid electrolytes were prepared in the same manner as Preparation Example 5 described above in FIGS. 14A and 14B except that the amounts of cross-linking agents each contained were as shown in Table 3 below.

TABLE 3

| Classification | Content of cross-linking agent | Ion conductivity |
|---|---|---|
| Preparation Example 7 | 3% by weight | 1.55 mS $cm^{-1}$ |
| Preparation Example 8 | 6% by weight | 1.35 mS $cm^{-1}$ |
| Preparation Example 9 | 9% by weight | 1.17 mS $cm^{-1}$ |
| Preparation Example 10 | 12% by weight | 0.98 mS $cm^{-1}$ |

Referring to FIGS. 13A and 13B and Table 3, as results of checking whether there were cross-linking or not by varying the content of the cross-linking agent to 3% by weight, 6% by weight, 9% by weight, and 12% by weight, it could be confirmed that the ionic conductivity decreased as the content of the cross-linking agent increased. That is, it could be confirmed that when the content of the cross-linking agent exceeded 3% by weight, the flowability of the electrolyte decreased, and as the content of the cross-linking agent increased, the viscosity of the electrolyte increased so that the ionic conductivity decreased. Here, 3% by weight, which shows the highest ionic conductivity in the quasi-solid state, is judged to be the most suitable content for making a quasi-solid electrolyte.

As described above, since the cross-linking agent according to the present invention, which has a boron atom at the center and a polyester structure inside, and the quasi-solid electrolyte using the same had an ionic liquid-based electrolyte having flame retardancy applied thereto, they have the property of not igniting, and due to this, the stability of the secondary battery can be improved.

Additionally, the boron functional group and polyester structure of the cross-linking agent according to the present invention can improve the cation mobility and electrochemical stability of the quasi-solid electrolyte.

Since the PAI porous support used as the porous support in the present invention has excellent heat resistance and porosity, it can improve the thermal stability and safety of electrolytes and secondary batteries and increase the ionic conductivity of the quasi-solid electrolyte.

The cross-linking agent having a boron functional group and a polyester structure according to the present invention is prepared by thermal polymerization. It is a quasi-solid and maintains high ionic conductivity and low activation energy despite the electrolyte having non-fluidity, and accordingly shows excellent electrochemical performance when applied to secondary batteries. Therefore, the quasi-solid electrolyte using the cation mobility-improving cross-linking agent of the present invention can be easily applied even to medium-to-large secondary battery systems such as electric vehicles or energy storage devices that require high safety and stable electrochemical performance.

A person skilled in the art to which the present invention pertains will understand that the present invention can be implemented in other specific forms without changing its technical idea or essential features. Therefore, the embodiments described above should be understood in all respects as illustrative and not restrictive. The scope of the present invention is indicated by the scope of the claims described below rather than the detailed description above, and all changes or modified forms derived from the meaning and scope of the claims and their equivalent concepts must be interpreted to be included in the scope of the present invention.

the quasi-solid electrolyte for the secondary battery according to claim 15, which is interposed between the cathode and the anode.

The invention claimed is:

1. A cross-linking agent for a quasi-solid electrolyte represented by the following Formula 1 or Formula 2:

[Formula 1]

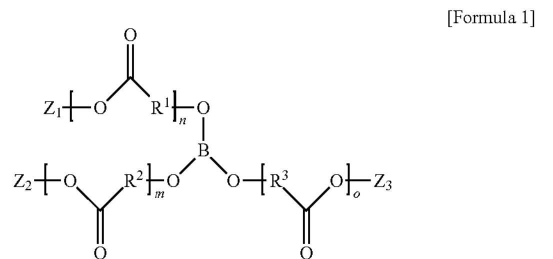

[Formula 2]

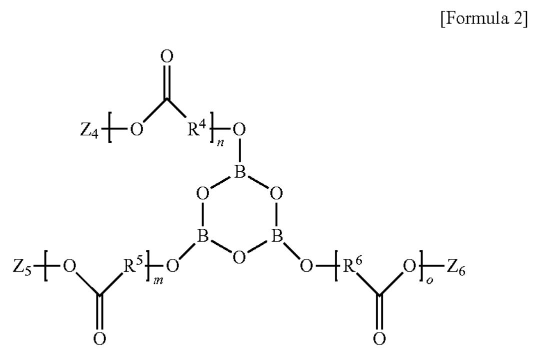

$R^1$ to $R^6$ in Formula 1 and Formula 2 are each independently a substituted or unsubstituted $C_1$-$C_{30}$ alkyl group, a substituted or unsubstituted $C_1$-$C_{30}$ haloalkyl group, or a substituted or unsubstituted $C_1$-$C_{30}$ hydroxyalkyl group, n, m, and o are each an integer of 1 to 15, and $Z_1$ to $Z_6$ are each independently

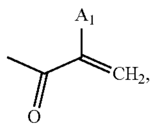

where $A_1$ is independently hydrogen, a substituted or unsubstituted $C_1$-$C_{12}$ alkyl group, a substituted or unsubstituted $C_1$-$C_{12}$ haloalkyl group, or a substituted or unsubstituted $C_1$-$C_{12}$ hydroxyalkyl group.

2. The cross-linking agent for the quasi-solid electrolyte of claim 1, wherein $Z_1$ to $Z_6$ in Formula 1 or Formula 2 are each independently an acryloyl group or a methacryloyl group.

3. The cross-linking agent for the quasi-solid electrolyte of claim 1, wherein $R^1$ to $R^6$ in Formula 1 or Formula 2 are each independently a substituted or unsubstituted $C_1$-$C_8$ alkyl group.

4. The cross-linking agent for the quasi-solid electrolyte of claim 1, wherein the cross-linking agent for the quasi-solid electrolyte is coordination-bonded to an anion of an alkali metal salt.

5. The cross-linking agent for the quasi-solid electrolyte of claim 1, wherein the alkali metal salt is a lithium salt or a sodium salt.

6. A method for preparing a cross-linking agent for a quasi-solid electrolyte, the method comprising:

a first operation of adding a polyol compound having two hydroxyl groups in the molecular structure and an amine compound to a first reaction solvent and then stirring the polyol compound, the amine compound, and the first reaction solvent to prepare a first mixture, and mixing a (meta) acryloyl group compound containing an acryloyl group or a methacryloyl group with a second reaction solvent to prepare a second mixture;

a second operation of adding the second mixture to the first mixture while maintaining the first mixture at −5° C. to 5° C. in an inert gas atmosphere, raising the temperature to room temperature, and then stirring and reacting the first mixture and the second mixture at room temperature for 10 to 20 hours, and then purifying the reactant to manufacture an intermediate product; and a third operation of adding the intermediate product to a third reaction solvent in an inert gas atmosphere, and then primarily stirring a boron compound containing one or more boron at 45° C. to 55° C. for 1.5 to 7 hours, and then secondarily stirring the primarily stirred mixture at 65° C. to 80° C. for 1 to 5 hours and drying the secondarily stirred mixture in a vacuum oven.

7. The method of claim 6, wherein the polyol compound and the amine compound in the first operation are added at a ratio in which the ratio [(OH)/($NH_2$)] of the number of moles of hydroxyl groups (OH) contained in the polyol compound to the number of moles of amine groups ($NH_2$) contained in the amine compound becomes a range of 1 to 12.

8. The method of claim 6, wherein the drying in the vacuum oven in the third operation is to remove the amine compound and the first to third reaction solvents, and includes performing a first drying in a vacuum oven at 50° C. to 70° C. for 3 to 6 hours, and then performing a second drying in a vacuum oven at 20° C. to 30° C. for 12 to 36 hours.

9. The method of claim 6, wherein the polyol compound includes one or more selected from polycaprolactone diol, poly(tetramethylene ether) glycol (PTMG), poly(propylene glycol) diol (PPG), poly(butylene adipate) diol (PBA), ethylene glycol, 1,3-propanediol, 2-methyl-1,3-propanediol, 1,3-butanediol, 1,4-butanediol, 1,6-hexanediol, 1,4-cyclohexanedimethanol, diethylene glycol, triethylene glycol, neopentyl glycol, dipropylene glycol, and hydroquinone-bis (β-hydroxyethyl) ether.

10. The method of claim 6, wherein the amine compound includes one or more selected from triethylamine, pyridine, N,N-diisopropylethylamine (DIEA), diethylamine, piperidine, pyrrolidine, N-methylmorpholine, 2,6-lutidine, 4-dimethylaminopyridine (DMAP), and imidazole.

11. The method of claim 6, wherein the (meth)acryloyl group compound includes one or more selected from acryloyl chloride and methacryloyl chloride.

12. The method of claim 6, wherein the boron compound is represented by following Formula 3 or Formula 4:

[Formula 3]

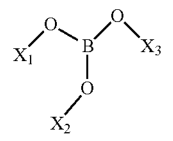

[Formula 4]

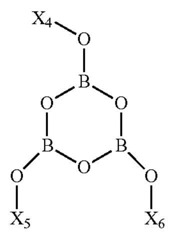

in Formula 3 or Formula 4, $X_1$ to $X_6$ are each independently a substituted or unsubstituted $C_1$-$C_{30}$ alkyl group, a substituted or unsubstituted $C_1$-$C_{30}$ haloalkyl group, or a substituted or unsubstituted $C_1$-$C_{30}$ hydroxyalkyl group.

13. The method of claim 6, wherein the boron compound includes one or more selected from trimethyl borate (TMB), trihydroxy boroxine, tris(2-methylpropene-1-yl) boroxine, and tris(dimethylamino)boroxine.

14. The method of claim 6, wherein the first to third reaction solvents include one or more selected from tetrahydrofuran, acetonitrile (ACN), methanol, ethanol, propanol, isopropanol, N,N-dimethylformamide, N,N-dimethylacetamide, N-methylpyrrolidone, and 1,4-dioxane.

15. A quasi-solid electrolyte for a secondary battery, comprising:

the cross-linking agent for a quasi-solid electrolyte according to claim 1;

a porous support;

an alkali metal salt;

a liquid electrolyte; and a thermal initiator.

16. The quasi-solid electrolyte for the secondary battery of claim 15, wherein the porous support includes a reticular structure with a porosity of 30% to 90% and a thickness of 10 μm to 200 μm.

17. The quasi-solid electrolyte for the secondary battery of claim 15, wherein the porous support includes one or more selected from polyethylene, polypropylene, polyvinylidene fluoride, polytetrafluoroethylene, polyethylene terephthalate, polybutylene terephthalate, polyamideimide, polyetherimide, polyacrylonitrile, a cellulose-based material, polyether sulfone, polyphenylsulfone, polyether ketone, and polyether ether ketone.

18. The quasi-solid electrolyte for the secondary battery of claim 17, wherein the porous support further includes alumina ($Al_2O_3$), and alumina ($Al_2O_3$) is contained in an amount of 1.5% by weight to 5% by weight.

19. The quasi-solid electrolyte for the secondary battery of claim 15, wherein the alkali metal salt is a lithium salt or a sodium salt.

20. The quasi-solid electrolyte for the secondary battery of claim 15, wherein the liquid electrolyte includes an organic solvent and an ionic liquid, the organic solvent includes one or more selected from ethylene carbonate, propylene carbonate, fluoroethylene carbonate, dimethyl carbonate, diethyl carbonate, ethyl methyl carbonate, dimethoxyethane, diethoxyethane, sulfolane, and 1,3-propanesultone, and the ionic liquid is represented by following Formula 5:

$X^+Y^-$ [Formula 5]

in Formula 5, X is a cation selected from the group consisting of imidazolium, ammonium, pyridinium, pyrazolium, piperidinium, triazolium, thiazolium, oxazolium, pyridazinium, pyrimidinium, pyrazinium, phosphonium, pyrrolidinium and sulfonium, and Y is an anion selected from the group consisting of $BF_4$, $PF_6$, $ClO_4$, $CF_3SO_3$, $N(CF_3SO_2)_2$, $N(C_2F_5SO_2)_2$, $C(CF_2SO_2)_3$, $AsF_6$, $SbF_6$, $AlCl_4$, $NbF_6$, and $CF_3CO_2$.

21. The quasi-solid electrolyte for the secondary battery of claim 15, wherein the thermal initiator includes one or more selected from t-amyl peroxide, benzoyl peroxide, lauroyl peroxide, t-butyl peroxypivalate, 1,1'-bis-(bis-t-butylperoxy)cyclohexane, 2,2'-azobisisobutyronitrile (AIBN), 2,2'-azobis-(2,4-dimethylvaleronitrile), 2,2'-azobis-(4-methoxy-2,4-dimethylvaleronitrile), 2-cyano-2-propylazoformamide, 1,1'-azobis(cyclohexane-1-carbonitrile), and 2,2'-azobis(2-methylbutyronitrile).

22. The quasi-solid electrolyte for the secondary battery of claim 15, wherein the cross-linking agent for the quasi-solid electrolyte is contained in an amount of 1 to 12 parts by weight based on 100 parts by weight of the total amount of the cross-linking agent for a quasi-solid electrolyte, the alkali metal salt, the liquid electrolyte, and the thermal initiator.

23. A secondary battery comprising:
a cathode;
an anode; and
the quasi-solid electrolyte for the secondary battery according to claim 15, which is interposed between the cathode and the anode.

* * * * *